US006576695B1

(12) United States Patent
Tanaka et al.

(10) Patent No.: US 6,576,695 B1
(45) Date of Patent: *Jun. 10, 2003

(54) THERMOPLASTIC RESIN COMPOSITION COMPRISING POLYGLYCERIN FATTY ACID ESTERS, AND RESIN MOLDED ARTICLE OBTAINED THEREFROM

(75) Inventors: Hiroyuki Tanaka, Kawasaki (JP); Naoki Yasuda, Tokyo (JP); Katsuhiro Otsuka, Tamamuri-machi (JP); Ryohei Watanabe, Tokyo (JP)

(73) Assignee: Ajinomoto Co., Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/566,786

(22) Filed: May 8, 2000

Related U.S. Application Data

(62) Division of application No. 09/141,733, filed on Aug. 27, 1998, now Pat. No. 6,147,148.

(30) Foreign Application Priority Data

| Sep. 2, 1997 | (JP) | ............................................. 9-252805 |
| Dec. 26, 1997 | (JP) | ............................................. 9-367586 |
| Dec. 26, 1997 | (JP) | ............................................. 9-368467 |

(51) Int. Cl.[7] .......................... C08K 5/511; C08L 21/00
(52) U.S. Cl. ....................... 524/312; 524/284; 524/310; 524/313; 524/317; 524/318; 524/376; 524/377
(58) Field of Search ................................ 524/317, 318, 524/376, 377, 310, 312, 313, 284

(56) References Cited

U.S. PATENT DOCUMENTS

| 4,481,324 A | * | 11/1984 | Hall et al. .................... 524/312 |
| 4,777,195 A | | 10/1988 | Hesse et al. |
| 4,830,779 A | * | 5/1989 | Maeno et al. ................. 252/512 |
| 5,166,271 A | * | 11/1992 | Masuko et al. ............... 525/282 |
| 5,317,051 A | * | 5/1994 | Harashige et al. ........... 524/310 |
| 5,384,173 A | * | 1/1995 | Akao et al. ................... 428/35.7 |
| 5,460,768 A | * | 10/1995 | Akao et al. ................... 264/297.2 |
| 5,814,697 A | * | 9/1998 | Akao et al. ................... 524/495 |
| 5,851,682 A | * | 12/1998 | Kotani et al. ................. 428/500 |
| 5,900,446 A | * | 5/1999 | Nishihara et al. ........... 524/127 |

FOREIGN PATENT DOCUMENTS

| EP | 0 047 634 | | 3/1982 | |
| EP | 047634 | * | 3/1982 | ............ C08L/23/10 |
| EP | 524404 | * | 1/1993 | ............. G03C/3/00 |
| EP | 0 524 404 | | 1/1993 | |
| EP | 758641 | * | 2/1997 | ............ C07C/69/33 |
| EP | 0 781 802 | | 7/1997 | |
| GB | 1 374 452 | | 11/1974 | |
| JP | 52-49254 | | 4/1977 | |
| JP | 52-144048 | | 12/1977 | |
| JP | 61157558 | * | 7/1986 | ................... 524/313 |
| JP | 62148555 | * | 7/1987 | ..................... 327/94 |
| JP | 63014101 | * | 1/1988 | ............. G02B/1/04 |
| JP | 64-90234 | | 4/1989 | |
| JP | 4-202429 | | 7/1992 | |
| JP | 04202429 | * | 7/1992 | ............ C08G/65/48 |
| JP | 7-5781 | | 1/1995 | |
| JP | 07109380 | * | 4/1995 | ............. C08K/5/13 |
| JP | 8-302065 | | 11/1996 | |
| JP | 09165352 | * | 6/1997 | ............ C07C/39/15 |
| WO | WO 9627637 | * | 9/1996 | |

OTHER PUBLICATIONS

Translation to Kadoi et al. (JP 04202429), Jul. 1992.*

* cited by examiner

*Primary Examiner*—Kelechi Egwim
(74) *Attorney, Agent, or Firm*—Oblon, Spivak, McClelland, Maier & Neustadt, P.C.

(57) ABSTRACT

A thermoplastic resin composition having an excellent thermal aging resistance, particularly when used in moldings is provided which contains (1) a thermoplastic resin and (2) at least one of a polyglycerin derivative in which at least one hydroxyl group is esterified with a fatty acid, an N-acyl basic amino acid and a dibasic acid erythritol ester, and wherein i) if the polyglycerin derivative is used, the composition contains an antioxidant, or an antioxidant and a filler;

ii) if the N-acyl basic amino acid is used, the composition contains a filler; and the thermoplastic resin contains at least one of a polyolefin resin, a polystyrene resin, a polyester resin, a polyamide resin and an engineering plastic; and iii) if the dibasic acid erythritol ester is used, the composition contains a filler, and the thermoplastic resin contains at least one of a polyolefin resin, a polystyrene resin, a polyester resin, a polyamide resin or an engineering plastic; and the amount of the dibasic acid erythritol ester is less than 1 part by weight per 100 parts by weight of the thermoplastic resin, and the ester includes an ester having a degree of esterification of not more than 50%.

35 Claims, No Drawings

THERMOPLASTIC RESIN COMPOSITION COMPRISING POLYGLYCERIN FATTY ACID ESTERS, AND RESIN MOLDED ARTICLE OBTAINED THEREFROM

This application is a Division of application Ser. No. 09/141,733 filed on Aug. 27, 1998, now U.S. Pat. No. 6,147,148.

BACKGROUND OF THE INVENTION

1. Field of the Invention

The present invention relates to a novel thermoplastic resin composition. More specifically, the present invention relates to a thermoplastic resin composition which can markedly improve a thermal aging (or ageing) resistance of a thermoplastic resin when it is molded, a resin molded article obtained by molding the same, and a terminal product (resin molded product) containing this molded article.

2. Description of the Related Art

A resin molded article which is obtained by using a thermoplastic resin, and, for example, kneading and molding the same, has been used in many fields, for example, automobile parts such as a bumper product and an instrumental panel, electric parts such as a computer housing, and building products such as an insulation material.

When producing these resin molded articles and molded products thereof, kneading was hitherto conducted with heating. However, this procedure was problematic in a thermal aging (or ageing) resistance in view of occurrence of coloration, a decrease in a resin strength and the like. Accordingly, in order to prevent this, an antioxidant was added (refer to Antioxidant Handbook, Taiseisha, 1st edition, published Oct. 25, 1976).

In this case, phenolic, phosphorus-type, amine-type and sulfur-type antioxidants are added to prevent the coloration and the decrease in the resin strength. However, the dispersibility of the antioxidant is poor. Further, even when it is added in a large amount, an ability to prevent the coloration cannot be exhibited satisfactorily. Addition of the antioxidant in a large amount decreases the resin strength, and is economically disadvantageous.

There is another method using an additive which is ordinarily employed as a lubricant, such as a fatty acid, a fatty acid metal soap, for example, a fatty acid calcium salt, or a fatty acid amide. Nevertheless, this method cannot provide a sufficient dispersion effect, and the lubricant is liable to bleed out from a resin molded article. It is known that a condensate of polyglycerin and a hydroxycarboxylic acid polycondensate (polyester) is used to improve a thermal aging resistance (refer to Japanese Patent Kokai Publication No. JP-A-8-302,065). However, a satisfactory thermal aging resistance is not necessarily provided. Further, it is reported that a composition obtained by mixing a thermoplastic resin with a polyglycerin fatty acid ester along with an inorganic filler can improve an impact strength and a weatherability (refer to Japanese Patent Kokai Publication No. JP-A-4-202,429). However, no satisfactory improvement of the thermal aging resistance is provided either.

Still further, there are reported a thermally stable polyolefin composition comprising a polyolefin, an inorganic filler, a hindered phenolic antioxidant, a sulfur-type antioxidant and a fatty acid (lauric acid, palmitic acid, stearic acid or the like) ester of a neopentyl-type polyhydric alcohol (refer to Japanese Patent Kokoku Publication No. JP-B-61-46,015), a method in which a porous sheet is produced by stretching a sheet obtained by melt-molding a composition comprising a polyolefin resin, a filler and a dipentaerythritol ester (refer to Japanese Patent Kokoku Publication No. JP-B-7-5, 781), an inorganic filler for a synthetic resin which is formed by coating a fatty acid ester of a polyhydric alcohol with an inorganic compound powder (refer to Japanese Patent Kokai Publication No. JP-A-52-49,254), a plastic composition obtained by incorporating a carrier and a fatty acid polyol-type ester in a synthetic resin (refer to Japanese Patent Kokai Publication No. JP-A-52-144,048), a polyolefin resin composition containing a polyolefin resin, an inorganic powder and an ester formed by the reaction of a trihydric or tetrahydric fatty alcohol, a fatty acid and a fatty dibasic acid in approximately equivalent amounts (refer to Japanese Patent Kokai Publication No. JP-A-64-90,234). However, the thermal aging resistance is not necessarily improved satisfactorily.

1. Problems to be Solved by the Invention

In the course of the completion to the present invention, the following problems have been also found by the present invention.

As is understandable from the prior art which has been explained above including the points at issue and the problem, the problem is to provide an additive or a thermoplastic resin composition which can improve a thermal aging resistance when a thermoplastic resin is molded.

It is an object of the present invention to provide, upon solving the above-mentioned problem, a thermoplastic resin composition which can improve a thermal aging resistance of a thermoplastic resin molded article which is formed through molding with a small amount of an additive in particular, further a resin molded article formed by molding the same and a terminal product (molded product) containing the same.

SUMMARY OF THE INVENTION

In order to solve the above-mentioned problems, the present inventors have assiduously conducted investigations, and have consequently found that a thermoplastic resin composition obtained by incorporating a combination of (i) a polyglycerin derivative in which at least one of hydroxyl groups of a polyglycerin molecule is esterified with a fatty acid and an antioxidant, especially, an antioxidant which is solid at normal temperatures and normal pressures into a thermoplastic resin; and/or (ii) an N-acyl basic amino acid and a filler into a thermoplastic resin, wherein for the thermoplastic resin at least one type selected from the group consisting of a polyolefin resin, a polystyrene resin, a polyester resin, a polyamide resin and an engineering plastic is contained; and/or (iii) a dibasic acid erythritol ester and a filler into a thermoplastic resin, the ester having a degree of esterification that does not exceed 50% is used, thereby making it possible to much decrease the amount of the ester, with the result that strength properties and a thermal aging resistance of a resin molded article formed by molding this composition, wherein the thermoplastic resin used therein is a thermoplastic resin containing at least one type selected from the group consisting of a polyolefin resin, a polystyrene resin, a polyester resin, a polyamide resin and an engineering plastic, the amount of the dibasic acid erythritol ester being less than 1 part by weight per 100 parts by weight of the thermoplastic resin;
are extremely excellent, particularly in strength properties and a thermal aging resistance of a resin molded article obtained by molding the same.

In using the polyglycerin derivative, it has been further found that when a filler or antioxidant, especially a solid antioxidant, is added and incorporated as required, the effect is all the more increased synergistically, and it is therefore preferable.

In using the N-acyl basic amino acid, the thermoplastic resin here referred to is a resin containing at least one type selected from the group consisting of a polyolefin resin, a polystyrene resin, a polyester resin, a polyamide resin and an engineering plastic.

In using also the N-acyl basic amino acid, it has been further found that when an antioxidant is added and incorporated as required, the effect is all the more increased, and it is therefore preferable.

In using the dibasic acid erythritol ester, the thermoplastic resin used is a thermoplastic resin containing at least one type selected from the group consisting of a polyolefin resin, a polystyrene resin, a polyester resin, a polyamide resin and an engineering plastic, the amount of the dibasic acid erythritol ester being less than 1 part by weight per 100 parts by weight of the thermoplastic resin.

In using also the dibasic acid erythritol ester, it has been further found that when an antioxidant, especially a solid antioxidant is added and incorporated as required, the effect is all the more increased synergistically.

These above findings have led to the completion of the present invention.

That is, the present invention is the following:

A thermoplastic resin composition comprising a thermoplastic resin and at least one of a polyglycerin derivative in which at least one hydroxyl group of a polyglycerin molecule is esterified with a fatty acid, an N-acyl basic amino acid and a dibasic acid erythritol ester, and:
  i) in using said polyglycerin derivative, further comprising an antioxidant, or further comprising an antioxidant and a filler;
  ii) in using said N-acyl basic amino acid, further comprising a filler, and wherein said thermoplastic resin contains at least one type selected from the group consisting of a polyolefin resin, a polystyrene resin, a polyester resin, a polyamide resin and an engineering plastic; and
  iii) in using said dibasic acid erythritol ester, further comprising a filler, and wherein said thermoplastic resin contains at least one type selected from the group consisting of a polyolefin resin, a polystyrene resin, a polyester resin, a polyamide resin and an engineering plastic, and the amount of said dibasic acid erythritol ester is less than 1 part by weight per 100 parts by weight of the thermoplastic resin, and said ester includes an ester having a degree of esterification of not more than 50%.

More specifically, in the present invention contains the followings:
  (i) A thermoplastic resin composition comprising three components, a thermoplastic resin, a polyglycerin derivative in which at least one hydroxyl group of a polyglycerin molecule is esterified with a fatty acid, and an antioxidant, or at least four components, these three components and further a filler, a resin molded article formed by molding the same and a molded product, as well as an agent for improving a thermal aging resistance of a thermoplastic resin, containing at least two components, the polyglycerin derivative and the antioxidant, or three components, these two components and further a filler, which are suitable for the composition in admixture or in combination, and the thermoplastic resin to be intended (ii) A thermoplastic resin composition comprising a thermoplastic resin containing at least one type selected from the group consisting of a polyolefin resin, a polystyrene resin, a polyester resin, a polyamide resin and an engineering plastic, an N-acyl basic amino acid and a filler, a resin molded article obtained by molding the same and a molded product, as well as an agent for improving a thermal aging resistance of the thermoplastic resin containing at least two components, the N-acyl basic amino acid and the filler, which are suitable for the composition in admixture or in combination, and the thermoplastic resin to be intended and (iii) A thermoplastic resin composition comprising three components, a thermoplastic resin containing at least one type selected from the group consisting of a polyolefin resin, a polystyrene resin, a polyester resin, a polyamide resin.and an engineering plastic, a dibasic acid erythritol ester and a filler, or four components, these three components and as required, an antioxidant, the amount of the dibasic acid erythritol ester being less than 1 part by weight per 100 parts by weight of the thermoplastic resin, and the ester including an.ester having the degree of esterification of not more than 50% (provided since an error of 10% or so is allowable, the degree of esterification of up to 55% is included in the present invention), preferably the degree of esterification of the ester being not more than 50% (provided since an error of 10% or so is allowable, the degree of esterification of up to 55% is included in the present invention), a resin molded article formed by molding the same and a molded product, as well as an agent for improving a thermal aging resistance of the thermoplastic resin containing at least two components, the dibasic acid erythritol ester and the filler, or three components, these two components and further an antioxidant which are suitable for the composition in admixture or in combination, and the thermoplastic resin to be intended.

In using the dibasic acid erythritol ester for the thermoplastic resin composition, the ester can include an ester having the degree of esterification of not more than 50%. It is advisable that the overall ester is an ester having an average degree of esterification of not more than 55%.

DETAILED DESCRIPTION OF THE PREFERRED EMBODIMENTS

Use of Polyglycerin Derivative in Agent for Improving Thermal Aging Registance of Thermoplastic Resin The mode for carrying out the thermoplastic resin incorporating the polyglycerin derivative in an agent for an improving thermal aging resistance of the thermoplastic resin in the present invention is firstly described in the following as one embodiment of the present invention.

The polyglycerin derivative used in this embodiment of the present invention can be a derivative in which a part or all of hydroxyl groups present in one polyglycerin molecule are esterified with a fatty acid, namely a polyglycerin fatty acid ester. The "derivative esterified with a fatty acid" or "polyglycerin fatty acid ester" in the presentinvention for this embodiment can be a derivative having a structure that at least one of hydroxyl groups of the polyglycerin is esterified with a fatty acid as a result, namely a structure having an oxygen-acyl group regardless of the production route. For example, not only an ester obtained by reacting polyglycerin with a fatty acid but also all other compounds, for example, derivatives having a structure that a part or all of hydroxyl groups of polyglycerin are esterified with a fatty acid as a result through a reaction with a lower alcohol ester of a fatty acid. Accordingly, the fatty acid-esterified derivative having the above-mentioned structure in this embodiment of the present invention can be provided through the reaction of a polyglycerin derivative different from the polyglycerin derivative used in this embodiment of the present invention, for example, a derivative in which a part or all of hydroxyl groups thereof are esterified with methyl, with a fatty acid.

The fatty acid-esterified moiety of the above-mentioned ester has preferably an acyl group:RCO constituting a fatty acid represented by the formula:RCOOH.

At this time, an ester in which hydroxyl groups in a molecule of polyglycerin are esterified with acyl groups of plural different fatty acids and an ester in which these are esterified with acyl groups of the same fatty acid are also available. Further, a mixture of these plural different esters is also available. For example, a mixture of an ester in which hydroxyl groups are esterified with acyl groups of the same fatty acid and an ester in which a part or all of hydroxyl groups of polyglycerin are esterified with acyl groups of a sole fatty acid different from the acyl groups of the same fatty acid is also available. Further, with respect to the ester in which hydroxyl groups in a molecule are esterified with acyl groups of plural different fatty acids, a mixture of plural esters in which esterification conditions are different, and further a mixture with an ester in which hydroxyl groups are esterified with the same fatty acid can also be used as the polyglycerin derivative in this embodiment of the present invention.

The ratio of hydroxyl groups esterified with a fatty acid is preferably from 1 hydroxyl group to approximately 2/3 of all hydroxyl groups, more preferably from 1 hydroxyl group to half of all hydroxyl groups. When a value of 2/3 or half of all hydroxyl groups is not a positive integer, fractions below a decimal point are counted as a positive number.

As the polyglycerin used in this embodiment of the present invention, a commercial compound which is industrially produced can be bought and obtained. Examples thereof include Polyglycerin #310, Polyglycerin #500 and Polyglycerin #750 made by Sakamoto Yakuhin Kogyo. Polyglycerin may be synthesized, and it can be obtained by heating glycerin at from 200 to 250° C. in the presence of a catalyst such as sodium hydroxide, potassium hydroxide, sulfuric acid or the like, and subjecting the resulting product to dehydrocondensation. The degree of polymerization of polyglycerin used in this embodiment of the present invention can be between 2 and 30, preferably between 3 and 10 in view of the properties of the product, the solubility in a solvent and the thermal aging resistance when a final molded article is produced. Incidentally, the polyglycerin may include, other than linear polyglycerin in which condensation occurs in the α-position, branched polyglycerin in which condensation occurs in the β-position, and cyclic polyglycerins.

The polyglycerin derivative used in this embodiment of the present invention, namely the polyglycerin fatty acid ester, can also be produced using a prior technique (refer to, for example, Japanese Patent Kokai Publication No. JP-A-4-202,429). It can also be produced separately.

It is not particularly difficult to produce the polyglycerin derivative from polyglycerin and a fatty acid by a direct esterification method. For example, a fatty acid represented by the above-mentioned formula, RCOOH can be reacted with polyglycerin having preferably the above-mentioned degree of polymerization by a usual method.

As the fatty acid, a hydrocarbon-type monocarboxylic acid is preferable. In this case, an organic compound (hydrocarbon) having only one carboxyl group as a functional group and free from a functional group reactive with a carboxyl group, such as a hydroxyl group, an amino group, a mercapto group or the like is especially preferable. Further preferable is a monocarboxylic acid having only one carboxyl group in a molecule and free from a hetero group such as an oxygen atom, a nitrogen atom, a sulfur atom or the like. For example, a monocarboxylic acid having a linear or branched, saturated or unsaturated alkyl group (hydrocarbon group) having from 5 to 31 carbon atoms is more preferable.

Accordingly, R is preferably a linear or branched, saturated or unsaturated alkyl group (hydrocarbon residue) having from 4 to 30 carbon atoms. An unsaturated alkyl group means not a saturated hydrocarbon group but a hydrocarbon residue having one or more double bonds and/or triple bonds therein. It is advisable that this group is free from an aromatic ring or an alicyclic ring.

Examples of the fatty acid used when the polyglycerin is prepared through the direct reaction of the fatty acid include fatty monocarboxylic acids such as caproic acid, enanthylic acid, caprylic acid, nonanoic acid, capric acid, octylic acid, lauric acid, myristic acid, behenic acid, palmitic acid, isostearic acid, stearic acid, oleic acid, isononanoic acid and arachic acid.

The reaction of the polyglycerin with the fatty acid is conducted with dehydration. Usually, the reaction temperature is preferably between 90 and 210° C. When it is higher than 250° C., the reaction product is colored. When it is lower than 90° C., the reaction time is prolonged. Thus, neither of them is desirous. Further, the reaction which is conducted in a nitrogen stream is preferable because a less colored product is obtained. In general, the reaction temperature is between 0.5 and 24 hours. In the reaction, a reaction solvent or a catalyst can be used.

When the solvent is used in the above-mentioned reaction of the polyglycerin with the fatty acid, preferable examples of the reaction solvent include hydrocarbon solvents such as toluene, xylene, n-hexane and petroleum ether; and ketone solvents such as acetone, methyl ethyl ketone and cyclohexanone.

A catalyst can be used in the esterification reaction of the. polyglycerin with the fatty acid as noted above. In this case, the catalyst is one which is ordinarily used in this type of the reaction. Examples thereof include quaternary ammonium salts such as tetramethylammonium chloride, tetrabutylammonium chloride, tetramethylammonium bromide, tetrabutylammonium bromide, tetramethylammonium iodide, tetrabutylammonium iodide, benzyltrimethylammonium chloride, benzyltrimethylammonium bromide and benzyltrimethylammonium iodide; quaternary phosphonium salts such as tetramethylphosphonium chloride, tetrabutylphosphonium chloride, tetramethylphosphonium bromide, tetrabutylphosphonium bromide, tetramethylphosphonium iodide, tetrabutylphosphonium iodide, benzyltrimethylphosphonium chloride, benzyltrimethylphosphonium bromide, benzyltrimethylphosphonium iodide tetraphenylphosphonium chloride, tetraphenylphosphonium bromide and tetraphenylphosphonium iodide; phosphorus compounds such as triphenylphosphine; organic carboxylic acid salts such as potassium acetate, sodium acetate, potassium benzoate and sodium benzoate; alkali metal alcoholates such as sodium alcoholate and potassium alcoholate; tertiary amines; organotin compounds; organoaluminum compounds; organotitanate compounds; and zinc compounds such as zinc chloride.

In this modification of the present invention, the reaction ratio in producing the ester from the polyglycerin and the fatty acid varies depending on a degree a of polymerization of the polyglycerin. Preferable is a polyglycerin derivative which is obtained by reacting 1 mol of polyglycerin having the (a+2) number of hydroxyl:OH groups with the fatty acid in an amount of at least 1 mol and at most 2×(a+2)/3 mols. More preferable is a polyglycerin derivative which is obtained through the reaction with the fatty acid in an amount of at least 1 mol and at most (a+2)/2 mols. A polyglycerin derivative which is obtained through the reaction of 1 mol of the polyglycerin with less than 1 mol of the fatty acid has a poor compatibility with the resin, decreasing the processability of the thermoplastic resin composition. Further, a polyglycerin derivative which is obtained through the reaction of 1 mol of the polyglycerin with the fatty acid in an amount of at least 2 mols and at most 2×(a+2)/3 has a good compatibility with the resin and is excellent especially in the processability. Still further, a polyglycerin derivative which is obtained through the reaction with the fatty acid in an amount of more than 2×(a+2)/3 mols can hardly provide an effect of improving the thermal aging resistance. A polyglycerin derivative which is obtained through the reaction with the fatty acid in an amount of at most (a+2)/2 mols is excellent especially in the thermal aging resistance.

The polyglycerin derivative in this embodiment of the present invention can also be produced by reacting a fatty acid ester with polyglycerin (ester interchange method). The polyglycerin used herein is as mentioned earlier. As the fatty acid ester, for example, an alcohol ester of a fatty acid which is obtained by subjecting an alcohol and a fatty acid to an esterification reaction can be used. As the fatty acid used herein, the fatty acid which has been described above concerning the method of producing the polyglycerin derivative in this embodiment of the present invention through the reaction of the polyglycerin with the fatty acid, is available.

As the alcohol, for example, an alcohol with a linear or branched, saturated or unsaturated hydrocarbon group having from 1 to 5 carbon atoms can be used. Examples thereof include methyl alcohol, ethyl alcohol, isopropyl alcohol, n-propyl alcohol, n-butyl alcohol and n-pentyl alcohol.

Specific examples of the fatty acid ester which is employed in the production of the polyglycerin derivative used in this embodiment of the present invention include alcohol esters of stearic acid and methyl, ethyl, isopropyl, n-propyl and n-butyl alcohols, and methyl esters of fatty acids such as caproic acid, enanthylic acid, octylic acid, lauric acid, myristic acid, palmitic acid and oleic acid.

It is advisable to conduct the reaction in which the polyglycerin and the fatty acid ester are reacted to produce the polyglycerin derivative used in this embodiment of the present invention while conducting removal of an alcohol in a usual manner.

With respect to the reaction conditions, the reaction conditions (reaction time and the like) described above regarding the method in which the polyglycerin is esterified through the reaction of the polyglycerin and the fatty acid can selectively be used as required. Also with respect to the reaction ratio of the reactants, the reaction ratio described above regarding the production of the polyglycerin derivative through the reaction of the polyglycerin with the fatty acid can be used. The amount of the fatty acid ester can appropriately be selected instead of that of the fatty acid used therein.

When a hydroxyl group which is not esterified with a fatty acid is present in the thus-prepared polyglycerin derivative, a derivative in which this hydroxyl group is not modified at all is preferable. However, even a derivative in which a hydroxyl group is partially modified or protected is included in this embodiment of the present invention so long as it has an effect of improving the thermal aging resistance of the present invention.

The thermoplastic resin used for this embodiment in the present invention may be a resin having a thermoplasticity. Examples of the main component include thermoplastic resins which are used in the field of composite materials, for example, polyolefin resins such as a polyethylene resin, a polypropylene resin and an ethylene-propylene copolymer; polycarbonate resins; polyester resins such as polyethylene terephthalate, polybutylene terephthalate and polybutylene naphthalate; polystyrene resins such as an acrylonitrile-butadiene-styrene copolymer and polystyrene; aromatic resins such as polyphenylene ether and polyphenylene sulfide; and vinyl resins such as vinyl chloride and vinyl acetate. They may be used either singly or in combination.

Of these resins, the polyolefin resins, the polystyrene resins and the polyester resins are preferable in view of the compatibility with the above-mentioned glycerin derivative and the thermal aging resistance. The polypropylene resin and the ethylene-propylene copolymer resin are most preferable.

The antioxidant used in the embodiment of the present invention is preferably solid itself at normal temperatures and normal pressures. Usually, the solvent is not particularly limited if it is used in the field of composite materials. Examples thereof include phenolic antioxidants such as 2,6-di-tert-butyl-p-cresol, 2,2'-methylenebis(4-methyl-6-tert-butylphenol), tetrakis{methylene-3-(3,5-di-tert-butyl-4-hydroxyphenyl)propionate}methane, 1,3,5-trimethyl-2,4,6-tris(3,5-di-tert-butyl-4-hydroxybenzyl)benzene and 1,1,3-tris(2-methyl-4-hydroxy-5-tert-butylphenol)butane; phosphorus-type antioxidants such as triisodecyl phosphite, diphenylisodecyl phosphite, triphenyl phosphite and trinonylphenyl phosphite; sulfur-type antioxidants such as dilauryl thiodipropionate, distearyl thiodipropionate and laurylstearyl thiodipropionate; and amine-type antioxidants such as phenyl-$\beta$-naphthylamine and N,N'-diphenyl-p-phenylenediamine. These can be used either singly or in combination.

When the antioxidant is liquid at normal temperatures and normal pressures, it tends to be non-uniform when it is mixed with a resin, a powder or the like. Meanwhile, when the antioxidant is solid, the polyglycerin derivative used in this embodiment of the present invention acts as a dispersant thereof because the antioxidant itself has a poor dispersibility, contributing much to the thermal aging resistance.

The thermoplastic resin composition of this embodiment in the present invention can contain from 0.01 to 10 parts by weight, preferably from 0.01 to 1 part by weight of the antioxidant, and from 0.01 to 10 parts by weight, preferably from 0.05 to 1 part by weight of the polyglycerin derivative, per 100 parts by weight of the thermoplastic resin.

In this embodiment of the present invention, the polyglycerin derivative and the antioxidant are used in combination. With respect to the ratio thereof, the polyglycerin is preferably between 0.1 to 1,000 parts by weight, more preferably between 1 and 500 parts by weight, per 100 parts by weight of the antioxidant, for example, a solid antioxidant. When the polyglycerin is more than 1,000 parts by weight, the thermal aging resistance of the thermoplastic resin composition is no longer improved, and the mechanical strength of the resin molded article is decreased. When it is less than 0.1 parts by weight, the effect provided by this embodiment in the present invention is not so great. Thus, neither of them is desirous.

Examples of a method of specifically producing the thermoplastic resin composition of this embodiment in the present invention includes 1) a method in which, for example, a solid antioxidant is previously treated with a polyglycerin derivative, and then mixed and kneaded with a thermoplastic resin and further additives such as a filler and the like as required, 2) a method in which an antioxidant, the polyglycerin derivative of this embodiment in the present invention, a thermoplastic resin and further additives such as a filler and the like as required are mixed and kneaded at a time, and 3) a method in which a filler such as talc or the like is previously treated with the polyglycerin derivative of this embodiment in the present invention, and the thus-treated filler, an antioxidant and a thermoplastic resin are mixed and kneaded. A specific method of producing a thermoplastic resin composition is described below.

The antioxidant, for example, a solid antioxidant, which is treated with the polyglycerin derivative obtained from polyglycerin and a fatty acid through esterification can be prepared by a dry method in which the polyglycerin derivative is directly added to the solid antioxidant, and the surface treatment is conducted using a stirrer such as a Henschel mixer, a ball mill, an atomizer colloid mill or a Banbury mixer.

The thermoplastic resin composition of this embodiment in the present invention may further contain a filler or other additives. The filler which is further incorporated in this embodiment of the present invention is not particularly limited if it is ordinarily used in the field of composite materials. Examples thereof include fibers such as glass fibers, carbon fibers, boron fibers, ceramic fibers (silicon carbide fibers, alumina fibers and the like) and metallic fibers, silica sand, silica rock, ballast, river sand, sea sand, crushed stone, carbon black, acetylene black, vegetable black, graphite, ivory black, bone black, pine black, titanium oxide, black iron oxide, manganese black, ilmenite black, chrome yellow, cadmium yellow, zinc yellow, cyanamid lead, naples yellow, ultramarine yellow, orpiment, vermilion, cadmium red, antimony red, red iron oxide, ultramarine red, ultramarine violet, cobalt violet, manganese violet, prussian blue, cobalt blue, chromium oxide green, Guignet's green, chrome green, zinc green, green earth, aquamarine, Paris green, yellow iron oxide, ochre, sienna, amber, white carbon, synthetic silicate, amorphous silica, whiting, calcium carbonate, calcium sulfate, calcium hydroxide, chalk, barite powder, barium sulfate, clay, tonoko, zinoko, talc, silica, glass powder, silicate pigment, diatomaceous earth, asbestos, wollastonite, calcium silicate, alumina, gypsum, aluminum powder, bronze powder, red lead oxide, cyanamide lead, lead chromate, lead sulfate, zinc powder, lead suboxide, ferrite magnetic powder composed of $MO.Fe_2O_3$ (in which M is one or more of Ba, Sr, Ca, Mg, Zn and Pb), samarium, cobalt, neodymium iron cobalt, zirconium cobalt, aluminum, iron, zinc, copper, silver, nickel, tungsten, molybdenum, rhenium, niobium, tantalum and lead. These can be used either singly or in combination.

It has been found that especially when talc is used as a filler, effects of improving the thermal aging resistance and the processability of the thermoplastic resin composition are markedly great as compared with the absence of the filler such as talc or the like.

Besides talc, fibers such as glass fibers, mica, clay, asbestos, wollastonite, calcium silicate, aluminum borate, xonotlite, sepiolite and moshige are preferable in view of the effect of improving the processability (for example, an increase in the molding rate). More preferable are glass fibers, mica and clay in view of the easy handling of the powder, the processability and economics. Talc is optimal because the combined use of the same and the solid antioxidant remarkably increases the effect from the standpoint of the thermal aging resistance. Talc is markedly effective for the polyolefin resins such as the polyethylene resin and the ethylene-propylene copolymer resin.

The filler which is treated with the glycerin derivative used in this embodiment of the present invention is formed by adopting (1) a dry method in which a glycerin derivative is added as such to a filler, and the surface treatment is conducted using a mixer such as a Henschel mixer, a ball mill, an atomizer colloid mill or a Banbury mixer, or (2) a wet method in which the glycerin derivative and the filler are added to the solvent, and mixed with stirring, and the solvent is then removed.

Examples of the solvent used in the wet method (2) of the above-mentioned surface treatment methods include phthalate esters, for example, diisobutyl phthalate, dioctyl phthalate, diheptyl phthalate and dibutyl phthalate, hydrocarbon solvents such as toluene, xylene, high-boiling petroleum hydrocarbons, n-hexane, cyclohexane and n-heptane; halogenated hydrocarbon solvents such as methylene chloride, chloroform and dichloroethane; ether solvents such as dioxane, tetrahydrofuran, butyl ether, butyl ethyl ether and diglyme; ketone solvents such as methyl isobutyl ketone, cyclohexanone and isophorone; ester solvents such as ethyl acetate, butyl acetate, ethylene glycol monoethyl ether acetate and 2-methoxypropyl acetate; alcohol solvents such as methyl alcohol, ethyl alcohol, n-propyl alcohol, isopropanol and butanol; alkylene glycol monoether solvents such as ethylene glycol monomethyl ether and propylene glycol monomethyl ether; amide solvents such as dimethylacetamide and dimethylformamide; and water. These can be used either singly or in combination as required.

There are (1) a method in which from 0.01 to 10 parts by weight, per 100 parts by weight of the thermoplastic resin, of the solid antioxidant preliminarily treated by the dry method is stirred using a stirrer such as a homomixer, a mixing and grinding machine, a kneader, a Banbury mixer or an atomizer, and (2) a method in which per 100 parts by weight of the thermoplastic resin, from 0.01 to 10 parts by weight of the untreated solid antioxidant and from 0.1 to 10 parts by weight of the polyglycerin derivative are stirred using a stirrer such as a homomixer, a mixing and grinding machine, a kneader, a Banbury mixer, a roll or an internal mixer. In the production of the same, the total amount of the polyglycerin derivative is not necessarily used at the same time. A method in which a part thereof is used in the pretreatment and another part thereof is added in the production of the thermoplastic resin composition is also available. Further, the kneading temperature varies depending on the type of the thermoplastic resin. It is advisable that the kneading temperature is determined on the basis of the gelation temperature of the thermoplastic resin used.

When the filler is further added to the thermoplastic resin composition, the amount of the filler used is preferably between 0.1 and 300 parts by weight, more preferably between 1 and 100 parts by weight, per 100 parts by weight of the thermoplastic resin. When it is more than 300 parts by weight, it is difficult to process the resin composition. When it is less than 0.01 parts by weight, the reinforcing effect for which the filler is used is not so high. Thus, neither of them is desirous. The amount of the filler is preferably between 100 and 10,000 parts by weight, further preferably between 500 and 10,000 parts by weight per 100 parts by weight of the antioxidant.

When the resin molded article is produced using the composition of this embodiment in the present invention, it is not particularly difficult, and an ordinary method of molding a resin can be employed. For example, a resin molded article can easily be obtained by molding the thermoplastic resin composition produced by the above-mentioned method using a roll, a press, an extrusion-molding machine, a transfer-molding machine or an injection-molding machine. Naturally, the resulting resin molded article and molded product also fall within the scope of the present invention.

Besides, the thermoplastic resin composition of this embodiment in the present invention can contain one or more of a stabilizer, an organic or inorganic pigment, a dye, a plasticizer, a lubricant such as a fatty acid, a fatty acid salt or a fatty acid amide, a foam stabilizer, a foaming agent, a phosphate ester, antimony or bromine-type fire retardant, an ultraviolet absorber, an antistatic agent such as monoglyceride or an amine compound, and a nucleating agent (which accelerates crystallization of a polymer and provides a transparent molded article).

The present invention includes the resin composition as well as the resin molded article obtained by molding the same and the molded product. The present invention for this embodiment further includes the agent for improving the thermal aging resistance of the thermoplastic resin, which contains at least two components, the polyglycerin derivative and the antioxidant or at least three components, these two components and as required, the filler (these plural components may be contained by being mixed or not by being separately combined for this purpose), and also the thermoplastic resin to be intended therefor. The operations of the polyglycerin derivative in the present invention for this embodiment can be explained in the following.

The operations and effects obtained by the present invention for this embodiment are considered to be exhibited through the following mechanism. The polyglycerin derivative used in this embodiment of the present invention has an affinity for the antioxidant, especially a solid antioxidant, and it is rapidly adsorbed on the surface. For example, the polyglycerin derivative used in this embodiment of the present invention can decrease the viscosity in the kneading because of a good wettability with an organic matrix of the thermoplastic resin or the like. Further, since it has in the end a side chain which exhibits a good wettability with the resin and the solvent component, a rigidity of a resin molded article after kneading and molding is not influenced. Further, the presence of the polyglycerin derivative used improves the thermal aging resistance of the resin molded article. The thermal aging resistance is improved presumably because the polyglycerin derivative forms a chelate with impurities contained in the catalyst or the filler used in the production of the thermoplastic resin, making it possible to decrease the amount of the antioxidant which leads to the improvement of the thermal aging resistance of the resin composition.

[Use of N-Acyl Basic Amino acid in Agent for Improving Thermal Aging Registance of Thermoplastic Resin]

The mode for carrying out the thermoplastic resin incorporating a N-acyl basic amino acid in an agent for an improving thermal aging registance of the thermoplastic resin in the present invention is secondly described in the following as the second embodiment for the present invention.

The N-acyl basic amino acid used in this embodiment of the present invention is a derivative in which at least one amino group or imino group of a basic amino acid is acylated, and an N-acyl basic amino acid in which an acyl group is not present in the α-position, for example, an $N^\epsilon$-acyl basic amino acid is preferable in view of the improvement of a thermal aging resistance or a fluidity.

As the basic amino acid constituting the N-acyl basic amino acid of this embodiment in the present invention, any basic amino acid can be employed. Not only an L-form, but also other isomers, for example, a D-form, a DL-form and a mixture thereof are available. Preferable examples of the basic amino acid include lysine, ornithine, histidine, arginine, αγ-dialkylbutyric acid and $N^\alpha$-lower alkyl substituted substances thereof because these are present in nature and can easily be obtained. Lysine and ornithine are especially preferable in view of the improvement of the thermal aging resistance.

The N-acyl basic amino acid used in this embodiment of the present invention may be an N-acyl basic amino acid of the same type, namely an N-acyl compound of one type of a basic amino acid having the same acyl group, and a mixture of plural different N-acyl compounds. For example, a mixture of an acyl compound which is $N^\epsilon$-acylated with an acyl group constituting the same fatty acid and an N-acyl compound in which an $N^\epsilon$-amino group of a basic amino acid is acylated with an acyl group of a fatty acid different from the acyl group constituting the above-mentioned fatty acid can also be used. Further, a mixture containing plural types of basic amino acids constituting the same can also be used as the N-acyl basic amino acid of this embodiment in the present invention.

When the N-acyl basic amino acid used in this embodiment of the present invention is produced from a basic amino acid, a commercial product which is industrially produced can be bought and obtained as the basic amino acid. For example, lysine and ornithine made by Ajinomoto Co., Inc. may be bought and used.

The N-acyl basic amino acid used in this embodiment of the present invention can be produced by utilizing the prior technique. For example, the basic amino acid can be subjected to an ordinary acylation method, especially a method in which an amino group (and/or imino group) in the $N^\epsilon$-position is acylated (refer to, for example, Japanese Patent Kokoku Publication No. JP-B-51-28,610).

Separately, an N-acyl basic amino acid can directly be produced too. For example, it can be produced using a monocarboxylic acid ester or a monocarboxylic acid chloride.

The monocarboxylic acid in producing the N-acyl basic amino acid through the reaction of the basic amino acid with the monocarboxylic acid is preferably a hydrocarbon-type monocarboxylic acid. In this case, an organic compound (hydrocarbon) having only one carboxyl group as a functional group and free from a functional group reactive with a carboxyl group, such as a hydroxyl group, an amino group, a mercapto group or the like is especially preferable. Further preferable is a monocarboxylic acid having one carboxyl group in a molecule and free from a hetero atom such as an oxygen atom, a nitrogen atom, a sulfur atom or the like. For example, a monocarboxylic acid with a linear or branched, saturated or unsaturated alkyl group (hydrocarbon residue) having from 5 to 31 carbon atoms is more preferable.

The above-mentioned unsaturated alkyl group means not a saturated hydrocarbon group, but a hydrocarbon residue having one or more double bonds and/or triple bonds therein. It is advisable that this group is free from an aromatic ring or an alicyclic ring.

Examples of the fatty acid used when producing the N-acyl basic amino acid through the direct reaction of the basic amino acid with the monocarboxylic acid include fatty monocarboxylic acids such as caproic acid, enanthylic acid, caprylic acid, nonanoic acid, capric acid, octylic acid, lauric acid, myristic acid, behenic acid, palmitic acid, isostearic acid, stearic acid, oleic acid, isononanoic acid and arachic acid.

When the N-acyl basic amino acid is produced from a carboxylic acid salt of a basic amino acid through the dehydration reaction, this production is conducted while carrying out the usual dehydration through the heating using, for example, the salt of the above-mentioned monocarboxylic acid. It is preferable that the reaction is conducted at a reaction temperature of from 90 to 250° C. When the temperature is higher than 250° C., a reaction product is colored. When the reaction temperature is less than 90° C., the reaction time is prolonged. Thus, both cases are undesirous. Further, the reaction is preferably conducted in a nitrogen stream because a less colored product is obtained. The reaction time is generally between 0.5 and 24 hours. In the reaction, it is possible to use a reaction solvent and a catalyst.

When the solvent is used in the above-mentioned dehydration reaction, preferable examples of the reaction solvent include hydrocarbon solvents such as toluene, xylene, n-hexane, petroleum ether and liquid paraffin; and anhydrous organic solvents such as dimethylformamide and dimethyl sulfoxide.

As the thermoplastic resin used in this embodiment of the present invention, a resin having a thermoplasticity will do. As its main component, chlorine-containing resins such as vinyl chloride and vinylidene chloride are undesirous because an effect of improving the thermal aging resistance can hardly be obtained. Examples of the thermoplastic resin which can be used in this embodiment of the present invention include polyolefin resins such as a polyethylene resin, a polypropylene resin and an ethylene-propylene copolymer; polycarbonate resins; polyester resins such as polyethylene terephthalate, polybutylene terephthalate and polybutylene naphthalate; polystyrene resins such as an acrylonitrile-butadiene-styrene copolymer and polystyrene; polyamide resins such as 6-nylon and 66-nylon; engineering plastics such as polyphenylene ether, polyphenylene sulfide, polyether ether ketone and polyimide; and other thermoplastic resins used in the field of composite materials. They may be used either singly or in combination.

Of these resins, the polyolefin resins are preferable in view of improving the compatibility with the N-acyl basic amino acid and the thermal aging resistance. The polypropylene resin and the ethylene-propylene copolymer resin are more preferable.

The filler used in this embodiment of the present invention is not particularly limited if it is ordinarily used in the field of composite materials. Specific examples thereof include fibers such as glass fibers, carbon fibers, boron fibers, ceramic fibers (silicon carbide fibers, alumina fibers and the like) and metallic fibers, silica sand, silica rock, ballast, river sand, sea sand, crushed stone, carbon black, acetylene black, vegetable black, graphite, ivory black, bone black, pine black, titanium oxide, black iron oxide, manganese black, ilmenite black, chrome yellow, cadmium yellow, zinc yellow, cyanamid lead, naples yellow, ultramarine yellow, orpiment, vermilion, cadmium red, antimony red, red iron oxide, ultramarine red, ultramarine violet, cobalt violet, manganese violet, prussian blue, cobalt blue, chromium oxide green, Guignet's green, chrome green, zinc green, green earth, aquamarine, Paris green, yellow iron oxide, ochre, sienna, amber, white carbon, synthetic silicate, amorphous silica, whiting, calcium carbonate, calcium sulfate, calcium hydroxide, chalk, barite powder, barium sulfate, clay, tonoko, zinoko, talc, silica, glass powder, silicate pigment, diatomaceous earth, asbestos, wollastonite, calcium silicate, alumina, gypsum, aluminum powder, bronze powder, red lead oxide, cyanamide lead, lead chromate, lead sulfate, zinc powder, lead suboxide, ferrite magnetic powder composed of $MO \cdot Fe_2O_3$ (in which M is one or more of Ba, Sr, Ca, Mg, Zn and Pb), samarium, cobalt, neodymium iron cobalt, zirconium cobalt, aluminum, iron, zinc, copper, silver, nickel, tungsten, molybdenum, rhenium, niobium, tantalum and lead. These can be used either singly or in combination.

It has been found that especially when talc is used as a filler, effects of improving the thermal aging resistance and the processability of the thermoplastic resin molded article are markedly great as compared with the absence of the filler such as talc or the like.

Besides talc, fibers such as glass fibers, mica, clay, asbestos, wollastonite, calcium silicate, aluminum borate, xonotlite, sepiolite and moshige are preferable in view of the effect of improving the processability (for example, an increase in the molding rate). More preferable are glass fibers, mica and clay in view of the easy handling of the powder, the processability and economics. Talc is optimal because the combined use of the same and the solid antioxidant remarkably increases the effect from the standpoint of the thermal aging resistance. Talc is markedly effective for the polyolefin resins such as the polyethylene resin and the ethylene-propylene copolymer resin.

The filler which is treated with the N-acyl basic amino acid used in this embodiment of the present invention is preferably employed because the effect is satisfactory with the addition of a small amount of the N-acyl basic amino acid. This filler is formed by adopting (1) a dry method in which an N-acyl basic amino acid is added as such to a filler, and the surface treatment is conducted using a mixer such as a Henschel mixer, a ball mill, an atomizer colloid mill or a Banbury mixer, (2) a method in which a basic amino acid and a monocarboxylic acid are adsorbed on a filler, and heated to form an N-acyl basic amino acid on the surface of the filler and conduct the surface treatment at the same time (refer to Japanese Patent Kokai Publication No. JP-A-61-4, 770) or (3) a method in which an N-acyl basic amino acid and a filler are mixed in a calcium chloride ethanol solution to conduct the surface treatment (refer to Japanese Patent Kokai Publication No. JP-A-60-67,565).

The conjoint use of the antioxidant in this embodiment of the present invention synergistically improves the effect. In this case, the antioxidant is preferably solid itself at normal temperatures and normal pressures. Usually, the solvent is not particularly limited if it is used in the field of composite materials. Examples thereof include phenolic antioxidants such as 2,6-di-tert-butyl-p-cresol, 2,2'-methylenebis(4-methyl-6-tert-butylphenol), tetrakis{methylene-3(3,5-di-tert-butyl-4-hydroxyphenyl)propionate}methane, 1,3,5-trimethyl-2,4,6-tris(3,5-di-tert-butyl-4-hydroxybenzyl) benzene and 1,1,3-tris(2-methyl-4-hydroxy-5-tertbutylphenol)butane; phosphorus-type antioxidants such as triisodecyl phosphite, diphenylisodecyl phosphite, triphenyl phosphite and trinonylphenyl phosphite; sulfur-type antioxidants such as dilauryl thiodipropionate, distearyl thiodipropionate and laurylstearyl thiodipropionate; and amine-type antioxidants such as phenyl-β-naphthylamine and N,N'-diphenyl-p-phenylenediamine. These can be used either singly or in combination.

When the antioxidant is liquid at normal temperatures and normal pressures, it tends to be non-uniform when it is mixed with a resin, a powder or the like. Meanwhile, when the antioxidant is solid, the N-acyl basic amino acid used in this embodiment of the present invention acts as a dispersant thereof because the antioxidant itself has a poor dispersibility, contributing much to the thermal aging resistance.

With respect to the amounts of the N-acyl basic amino acid and the filler in the thermoplastic resin composition of this embodiment in the present invention, the N-acyl basic amino acid can be preferably between 0.005 and 10 parts by weight, more preferably between 0.05 and 1 part by weight, and the filler can be preferably between 0.1 and 300 parts by weight, more preferably between 1 and 100 parts by weight, per 100 parts by weight of the thermoplastic resin.

When the amount of the N-acyl basic amino acid exceeds 10 parts by weight per 100 parts by weight of the thermoplastic resin, the strength of the molded article is decreased. When it is less than 0.005 parts by weight, no expected effect is obtained. Thus, neither of them is desirous.

When the amount of the filler exceeds 300 parts by weight per 100 parts by weight of the thermoplastic resin, it is difficult to process the resin composition. When it is less than 0.01 parts by weight, the reinforcing effect for which the filler is used is not so high. Thus, neither of them is desirous.

In the present invention for this embodiment, an antioxidant can further be used in addition to the N-acyl basic amino acid and the filler. In this case, with respect to the mixing ratio, the antioxidant can be used such that the N-acyl basic amino acid is between 0.1 and 1,000 parts by weight per 100 parts by weight of the antioxidant, for example, a solid antioxidant. It is more preferably between 1 and 500 parts by weight. When it is more than 1,000 parts by weight, the thermal aging resistance of the thermoplastic resin composition is not improved any more, inviting the decrease in the mechanical strength of the resin molded article. When it is less than 0.1 parts by weight, the effect provided by the present invention for this embodiment is not so high. Thus, neither of them is desirous.

Examples of a method of specifically producing the thermoplastic resin composition of this embodiment in the present invention includes 1) a method in which, for example, a solid antioxidant is previously treated with an N-acyl basic amino acid as required, and then mixed and kneaded with a thermoplastic resin and further a filler and other additives which are used as required, 2) a method in which the N-acyl basic amino acid of this embodiment in the present invention, a thermoplastic resin and further additives such as a filler and the like are mixed and kneaded at a time, and 3) a method in which a filler such as talc or the like is previously treated with the N-acyl basic amino acid of this embodiment in the present invention, and the thus-treated filler, an antioxidant which is added as required and a thermoplastic resin are mixed and kneaded. A specific method of producing a thermoplastic resin composition is described below.

The antioxidant can conjointly be used in this embodiment of the present invention as mentioned above. For instance, the antioxidant, for example, a solid antioxidant, which is treated with the N-acyl basic amino acid can be prepared by a dry method in which the N-acyl basic amino acid is directly added to the solid antioxidant, and the surface treatment is conducted using a stirrer such as a Henschel mixer, a ball mill, an atomizer colloid mill or a Banbury mixer.

When the resin molded article is produced using the composition of this embodiment in the present invention, it is not particularly difficult, and an ordinary method of molding a resin can be employed. For example, a resin molded article can easily be obtained by molding the thermoplastic resin composition produced by the above-mentioned method using a roll, a press, an extrusion-molding machine, a transfer-molding machine or an injection-molding machine. Naturally, the resulting resin molded article and molded product also fall within the scope of the present invention.

Besides, the thermoplastic resin composition of the present invention for this embodiment can contain one or more of other additives, for example, a stabilizer, an organic or inorganic pigment, a dye, a plasticizer, a lubricant such as a fatty acid, a fatty acid salt or a fatty acid amide, a foam stabilizer, a foaming agent, a phosphate ester, antimony or bromine-type fire retardant, an ultraviolet absorber, an antistatic agent such as monoglyceride or an amine compound, and a nucleating agent (which accelerates crystallization of a polymer and provides a transparent molded article).

The present invention for this embodiment includes the resin composition as well as the resin molded article obtained by molding the same and the molded product. The present invention for this embodiment further includes the agent for improving the thermal aging resistance of the thermoplastic resin, which contains at least two components, the N-acyl basic amino acid and the filler (these plural components may be contained by being mixed or not by being mixed but by being separately combined for this purpose), and also the thermoplastic resin to be intended therefor.

The operations of the N-acyl basic amino acid in the present invention can be explained in the following.

The operations and effects obtained for the resin composition incorporating the N-acyl basic amino acid in the present invention are considered to be exhibited through the following mechanism. The N-acyl basic amino acid used in the present invention can decrease the viscosity in the kneading because of a good wettability with an organic matrix of the thermoplastic resin or the like. Further, the presence of the N-acyl basic amino acid used improves the thermal aging resistance of the resin molded article. The thermal aging resistance is improved presumably because the N-acyl basic amino acid forms a chelate with impurities contained in the resin or the filler, for example, metals such as iron, copper and the like, making it possible to provide the antioxidation effect and to improve more the thermal aging resistance of the resin composition.

[Use of Dibasic Acid Erythritol Ester in Agent for Improving Thermal Aging Regictance of Thermoplastic Resin]

The mode for carrying out the thermoplastic resin incorporating a dibasic acid erythrytol ester in an agent for an improving thermal aging resistance of the thermoplastic resin in the present invention is thirdly described in the following as the third embodiment in the present invention.

The dibasic acid erythritol ester used in this embodiment of the present invention includes an ester of a dibasic acid and an erythritol, preferably an ester in which two carboxyl groups of the dibasic acid are esterified with erythritols, and an ester in which a part of hydroxyl groups not participating in the ester linkage with an erythritol, which is present in the erythritol moiety is esterified, for example, a derivative in which it is esterified with an acyl group moiety of a monocarboxylic acid. Both of them are called a "dibasic acid erythritol ester" in the present specification for this embodiment.

That is, the ester is an ester resulting from the esterification of an erythritol, in which a part of hydroxyl groups may or may not be esterified, and a carboxyl group moiety of a dibasic acid. For example, the ester can be formed by an esterification reaction (also including an ester interchange reaction) of an erythritol and a dibasic acid (or its ester), or an erythritol, a dibasic acid (or its ester) and a monocarboxylic acid (or its ester).

As the ester of the present invention for this embodiment, an ester in which two carboxyl groups of a dibasic acid in a molecule are esterified with two erythritol molecules which are the same or different, and a derivative in which a part of free hydroxyl groups not participating in the ester linkage of the erythritol constituting the ester is esterified with an acyl group moiety of a monocarboxylic acid are preferable. In this case, the degree of esterification does not exceed 50%, and the limit thereof is up to 55% since the error is included therein. When the degree of esterification exceeds 50%, the modulus of the resin is decreased, inviting the decrease in the bending strength. Further, the effect of improving the thermal aging resistance is undesirously decreased.

By the way, the degree of esterification refers to, in the dibasic acid erythritol ester of the present invention for this embodiment, percentage of a hydroxyl group of the erythritol which is esterified with a dibasic acid or with a dibasic acid and a monocarboxylic acid when the total amount of hydroxyl groups of the erythritol constituting the ester is defined as 100%.

In the dibasic acid erythritol ester of this embodiment in the present invention, erythritols which are bound to two carboxyl group moieties of the dibasic acid residue in the molecule through the ester linkage are the same or different as mentioned above. With respect to hydroxyl group moieties of erythritols in the ester, when a plurality of hydroxyl groups are esterified with acyl groups of a monocarboxylic acid, these plural acyl groups may be the same or different. However, in view of easy production, esterification with the same acyl groups is conducted easily. Further, a mixture of esters obtained with different dibasic acid residues is also available as the dibasic acid erythritol ester of the present invention for this embodiment.

The erythritol constituting the dibasic acid erythritol ester which is a component of this embodiment in the present invention is a branched polyhydric alcohol. A compound represented by formula (I) is preferable.

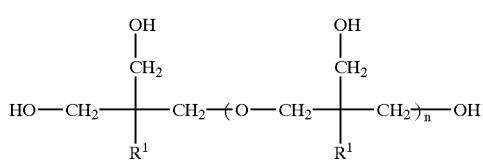

(I)

wherein $R^1$ present in plural number, all are independent each other, and each $R^1$ represents anyone of a methyl group ($CH_3$), an ethyl group ($C_2H_5$) and a methylol group ($CH_2OH$), and n is an integer of from 0 to 5.

Examples thereof include pentaerythritol, trimethylolpropane, trimethylolethane, dipentaerythritol and tripentaerythritol.

The dibasic acid constituting the dibasic acid erythritol ester which is a component of the present invention for this embodiment is a hydrocarbon compound having two carboxyl groups in a molecule. Examples thereof include residues of aliphatic dibasic acids such as adipic acid, sebacic acid, azelaic acid and succinic acid, and unsaturated dibasic acids such as phthalic acid and maleic acid.

The monocarboxylic acid is preferably a hydrocarbon-type monocarboxylic acid. In this case, an organic compound (hydrocarbon) having only one carboxyl group as a functional group and free from another functional group reactive with a carboxyl group, such as a hydroxyl group, an amino group, a mercapto group or the like is especially preferable. Further preferable is a monocarboxylic acid having one carboxyl group in a molecule and free from a hetero atom such as an oxygen atom, a nitrogen atom, a sulfur atom or the like. For example, a monocarboxylic acid with a linear or branched, saturated or unsaturated alkyl group (hydrocarbon residue) having from 2 to 30 carbon atoms is more preferable, and a monocarboxylic acid having from 6 to 30 carbon atoms is further preferable.

The above-mentioned unsaturated alkyl group means not a saturated hydrocarbon group, but a hydrocarbon residue having one or more double bonds and/or triple bonds therein. It is advisable that this group is free from an aromatic ring or an alicyclic ring.

Examples of the monocarboxylic acid include acetic acid, propionic acid, caproic acid, enanthylic acid, caprylic acid, nonanoic acid, capric acid, octylic acid, lauric acid, myristic acid, behenic acid, palmitic acid, isostearic acid, stearic acid, oleic acid, isononanoic acid, arachic acid, tridecylic acid, pentadecylic acid and heptadecylic acid.

When the dibasic acid erythritol ester which is a component of the present invention for this embodiment is produced, an ordinary esterification method can be employed. For example, two components constituting the same, namely an erythritol and a dibasic acid are subjected to the ordinary esterification step. If required, the thus-obtained ester and the above-mentioned monocarboxylic acid are further subjected to the ordinary esterification step, or three components, namely the above-mentioned two components and the monocarboxylic acid are subjected to the ordinary esterification step, making it possible to produce a desired dibasic acid erythritol ester.

As the erythritol constituting the dibasic acid erythritol ester used in the present invention for this embodiment, a commercial compound which is industrially produced can be bought and obtained. For example, with respect to pentaerythritol and dipentaerythritol, products of Koei Kagaku K.K. can be bought and used.

As the dibasic acid (or its ester) constituting the above-mentioned ester used in this embodiment of the present invention, a commercial compound which is industrially produced can be bought and obtained. For example, as adipic acid, a product of Kanto Denka K.K. and as azelaic acid, a product of Emery can be bought and used respectively.

The above-mentioned esterification reaction is carried out while conducting dehydration. It is preferable that the reaction is conducted at a reaction temperature of from 90 to 250° C. When the temperature is higher than 260° C., a reaction product is colored. When the reaction temperature is less than 90° C., the reaction time is prolonged. Thus, both cases are undesirous. Further, the reaction is preferably conducted in a nitrogen stream because a less colored product is obtained. The reaction time is generally between 0.5 and 24 hours. In the reaction, it is possible to use a reaction solvent and a catalyst.

When the solvent is used in the above-mentioned esterification reaction step, preferable examples of the reaction solvent include hydrocarbon solvents such as toluene, xylene, n-hexane and petroleum ether; and ketone solvents such as acetone, methyl ethyl ketone and cyclohexanone.

A catalyst can be used in the esterification reaction as noted above. In this case, the catalyst is one which is ordinarily used in this type of the reaction. Examples thereof include quaternary ammonium salts such as tetramethylammonium chloride, tetrabutylammonium chloride, tetramethylammonium bromide, tetrabutylammonium bromide, tetramethylammonium iodide, tetrabutylammonium iodide, benzyltrimethylammonium chloride, benzyltrimethylammonium bromide and benzyltrimethylammonium iodide; quaternary phosphonium salts such as tetramethylphosphonium chloride, tetrabutylphosphonium chloride, tetramethylphosphonium bromide, tetrabutylphosphonium bromide, tetramethylphosphonium iodide, tetrabutylphosphonium iodide, benzyltrimethylphosphonium chloride, benzyltrimethylphosphonium bromide, benzyltrimethylphosphonium iodide, tetraphenylphosphonium chloride, tetraphenylphosphonium bromide and tetraphenylphosphonium iodide; phosphorus compounds such as triphenylphosphine; organic carboxylic acid salts such as potassium acetate, sodium acetate, potassium benzoate and sodium benzoate; alkali metal alcoholates such as sodium alcoholate and potassium alcoholate; tertiary amines; organotin compounds; organoaluminum compounds; organotitanate compounds; and zinc compounds such as zinc chloride.

When the dibasic acid erythritol ester which is a component of the present invention for this embodiment is produced, the ester interchange method other than the ordinary esterification method can be employed. In this case, a desired dibasic acid erythritol ester can be produced by using two components, the erythritol and the dibasic acid ester, or three components, the erythritol, the dibasic acid ester and the monocarboxylic acid ester and subjecting the same to the ordinary ester interchange reaction. The erythritol used herein is as described above.

As the dibasic acid ester and the monocarboxylic acid ester used in the above-mentioned ester interchange reaction, for example, a dibasic acid mono- and/or di-alcohol ester or a monocarboxylic acid alcohol ester which is easily obtained by esterification of an alcohol and, for example, the above-mentioned dibasic acid or the above-mentioned monocarboxylic acid can be used.

In the present invention for this embodiment, the dibasic acid and the monocarboxylic acid include those in not only a free form but also the above-mentioned ester form.

As the above-mentioned dibasic acid ester and monocarboxylic acid ester, for example, the alcohol ester of the dibasic acid or the monocarboxylic acid which is formed by subjecting the alcohol and the dibasic acid or the monocarboxylic acid to the esterification reaction can be used. With respect to the dibasic acid or the monocarboxylic acid used herein, the above-described dibasic acid or monocarboxylic acid is available.

As the alcohol constituting the above-mentioned alcohol ester of the dibasic acid or the monocarboxylic acid, for example, an alcohol containing therein a linear or branched, saturated or unsaturated hydrocarbon group having from 1 to 5 carbon atoms can be used. Examples thereof include methyl alcohol, ethyl alcohol, isopropyl alcohol, n-propyl alcohol, n-butyl alcohol and n-pentyl alcohol.

Specific examples of the above-mentioned alcohol ester of the dibasic acid include alcohol esters of adipic acid and mono- or di-methyl, ethyl, isopropyl, n-propyl and n-butyl alcohols, and di-methyl esters of dibasic acids such as sebacic acid, azelaic acid and phthalid acid.

Specific examples of the alcohol ester of the monocarboxylic acid include alcohol esters of stearic acid and methyl, ethyl, isopropyl, n-propyl and n-butyl alcohols; and methyl esters of monocarboxylic acids such as caproic acid, enanthylic acid, octylic acid, lauric acid, myristic acid, palmitic acid and oleic acid.

It is advisable that the reaction of producing the dibasic acid erythritol ester through the ester interchange is conducted with removal of alcohol in a usual manner. With respect to the reaction conditions, the ordinary esterification reaction conditions (reaction time and the like) can selectively be used as required. Concerning the reaction ratio of the reactants, a necessary reaction ratio can selectively be used as required for obtaining the desired dibasic acid erythritol ester.

When an unesterified hydroxyl group is present in the thus-obtained dibasic acid erythritol ester, a derivative in which this hydroxyl group is not modified at all is preferable. However, a derivative in which a part of hydroxyl groups is modified or protected is also included in the dibasic acid erythritol ester of this embodiment in the present invention so long as the effect of improving the thermal aging resistance in the present invention for this embodiment is provided. However, as mentioned above, it is undesirous that more than half of all hydroxyl groups of the erythritol moiety constituting the ester of the present invention for the embodiment are esterified or modified, because the effect of improving the thermal aging resistance is decreased.

Examples of the thermoplastic resin which can be used in the present invention for the embodiment include polyolefin resins such as a polyethylene resin, a polypropylene resin and an ethylene-propylene copolymer; polycarbonate resins; polyester resins such as polyethylene terephthalate, polybutylene terephthalate and polybutylene naphthalate; polystyrene resins such as an acrylonitrile-butadiene-styrene copolymer and polystyrene; polyamide resins such as 6-nylon and 66-nylon; engineering plastics such as polyphenylene ether, polyphenylene sulfide, polyether ether ketone and polyimide; and other thermoplastic resins used in the field of composite materials. They may be used either singly or in combination Of these resins, the polyolefin resins, the polystyrene resins and the polyester resins are preferable in view of the compatibility with the above-mentioned dibasic acid erythritol ester and the thermal aging resistance. The polypropylene resin and the ethylene-propylene copolymer resin are most preferable.

The filler used in the present invention for this embodiment is not particularly limited if it is ordinarily used in the field of composite materials. Examples thereof include fibers such as glass fibers, carbon fibers, boron fibers, ceramic fibers (silicon carbide fibers, alumina fibers and the like) and metallic fibers, silica sand, silica rock, ballast, river sand, sea sand, crushed stone, carbon black, acetylene black, vegetable black, graphite, ivory black, bone black, pine black, titanium oxide, black iron oxide, manganese black, ilmenite black, chrome yellow, cadmium yellow, zinc yellow, cyanamid lead, naples yellow, ultramarine yellow, orpiment, vermilion, cadmium red, antimony red, red iron oxide, ultramarine red, ultramarine violet, cobalt violet, manganese violet, prussian blue, cobalt blue, chromium oxide green, Guignet's green, chrome green, zinc green, green earth, aquamarine, Paris green, yellow iron oxide, ochre, sienna, amber, white carbon, synthetic silicate, amorphous silica, whiting, calcium carbonate, calcium sulfate, calcium hydroxide, chalk, barite powder, barium sulfate, clay, tonoko, zinoko, talc, silica, glass powder, silicate pigment, diatomaceous earth, asbestos, wollastonite, calcium silicate, alumina, gypsum, aluminum powder, bronze powder, red lead oxide, cyanamide lead, lead chromate, lead sulfate, zinc powder, lead suboxide, ferrite magnetic powder composed of $MO \cdot Fe_2O_3$ (in which M is one or more of Ba, Sr, Ca, Mg, Zn and Pb), samarium, cobalt, neodymium iron cobalt, zirconium cobalt, aluminum, iron, zinc, copper, silver, nickel, tungsten, molybdenum, rhenium, niobium, tantalum and lead. These can be used either singly or in combination.

It has been found that especially when talc is used as a filler, effects of improving the thermal aging resistance and the processability of the thermoplastic resin composition are markedly great as compared with the absence of the filler such as talc or the like.

Besides talc, fibers such as glass fibers, mica, clay, asbestos, wollastonite, calcium silicate, aluminum borate, xonotlite, sepiolite and moshige are preferable in view of the effect of improving the processability (for example, an increase in the molding rate). More preferable are glass fibers, mica and clay in view of the easy handling of the powder, the processability and economics. Talc is optimal because the combined use of the same and the solid antioxidant remarkably increases the effect from the standpoint of the thermal aging resistance. Talc is markedly effective for the polyolefin resins such as the polyethylene resin and the ethylene-propylene copolymer resin.

The filler which is treated with the dibasic acid erythritol ester used in this embodiment of the present invention is preferably employed because the amount of the dibasic acid erythritol ester can be decreased. This filler is formed by adopting (1) a dry method in which a dibasic acid erythritol ester is added as such to a filler, and the surface treatment is conducted using a mixer such as a Henschel mixer, a ball mill, an atomizer colloid mill or a Banbury mixer, or (2) a wet method in which the dibasic acid erythritol ester and the filler of this embodiment in the present invention are added to the solvent, and mixed with stirring, and the solvent is then removed.

Examples of the solvent used in the wet method (2) of the above-mentioned surface treatment methods include phthalate esters, for example, diisobutyl phthalate, dioctyl phthalate, diheptyl phthalate and dibutyl phthalate, hydrocarbon solvents such as toluene, xylene, high-boiling petroleum hydrocarbons, n-hexane, cyclohexane and n-heptane; halogenated hydrocarbon solvents such as methylene chloride, chloroform and dichloroethane; ether solvents such as dioxane, tetrahydrofuran, butyl ether, butyl ethyl ether and diglyme; ketone solvents such as methyl isobutyl ketone, cyclohexanone and isophorone; ester solvents such as ethyl acetate, butyl acetate, ethylene glycol monoethyl ether acetate and 2-methoxypropyl acetate; alcohol solvents such as methyl alcohol, ethyl alcohol, n-propyl alcohol, isopropanol and butanol; alkylene glycol monoether solvents such as ethylene glycol monomethyl ether and propylene glycol monomethyl ether; amide solvents such as dimethylacetamide and dimethylformamide; and water. These can be used either singly or in combination as required.

When the solubility of the dibasic acid erythritol ester is low, the solvent may be used by being heated.

The conjoint use of the antioxidant in the present invention for the embodiment synergistically improves the effect. In this case, the antioxidant is preferably solid itself at normal temperatures and normal pressures. Usually, the solvent is not particularly limited if it is used in the field of composite materials. Examples thereof include phenolic antioxidants such as 2,6-di-tert-butyl-p-cresol, 2,2'-methylenebis(4-methyl-6-tert-butylphenol), tetrakis{methylene-3(3,5-di-tert-butyl-4-hydroxyphenyl)propionate}methane, 1,3,5-trimethyl-2,4,6-tris(3,5-di-tert-butyl-4-hydroxybenzyl)benzene and 1,1,3-tris(2-methyl-4-hydroxy-5-tert-butylphenol)butane; phosphorus-type antioxidants such as triisodecyl phosphite, diphenylisodecyl phosphite, triphenyl phosphite and trinonylphenyl phosphite; sulfur-type antioxidants such as dilauryl thiodipropionate, distearyl thiodipropionate and laurylstearyl thiodipropionate; and amine-type antioxidants such as phenyl-β-naphthylamine and N,N'-diphenyl-p-phenylenediamine. These can be used either singly or in combination.

When the antioxidant is liquid at normal temperatures and normal pressures, it tends to be non-uniform when it is mixed with a resin, a powder or the like. Meanwhile, when the antioxidant is solid, the dibasic acid erythritol ester used in this embodiment the present invention acts as a dispersant thereof because the antioxidant itself has a poor dispersibility, contributing much to the thermal aging resistance.

With respect to the amounts of the dibasic acid erythritol ester, the filler and as required, the antioxidant in the thermoplastic resin composition of the present invention for the embodiment, the dibasic acid erythritol ester is less than 1 part by weight, preferably between 0.002 and 0.8 parts by weight per 100 parts by weight of the mixture of the thermoplastic resin and the filler. When the amount exceeds this range, the decrease in the strength of the molded article occurs. Meanwhile, when it is less than this range, the expected effect is not obtained. Thus, neither of them is desirous.

With respect to the amounts of the additives in the thermoplastic resin, the fibber is preferably between 0.1 and 300 parts by weight, more preferably between 1 and 100 parts by weight, the dibasic acid erythritol ester is preferably between 0.002 and 0.8 parts by weight, more preferably between 0.005 and 0.6 parts by weight, and the antioxidant is preferably between 0.01 and 10 parts by weight, more preferably between 0.1 and 5 parts by weight, per 100 parts by weight of the thermoplastic resin.

When the amount of the filler exceeds 300 parts by weight, the kneading becomes difficult, and it is not practical. When it is less than 0.1 parts by weight, the expected effect is not obtained. Thus, neither of them is desirous.

Examples of a method of specifically producing the thermoplastic resin composition of this embodiment in the present invention includes 1) a method in which, for example, a solid antioxidant is previously treated with a dibasic acid erythritol ester as required, and then mixed and kneaded with a thermoplastic resin and further a filler and other additives which are used as required, 2) a method in which an antioxidant, the dibasic acid erythritol ester of the present invention for the embodiment, a thermoplastic resin and further additives such as a filler and the like as required are mixed and kneaded at a time, and 3) a method in which a filler such as talc or the like is previously treated with the dibasic acid erythritol ester of this embodiment in the present invention, and the thus-treated filler, an antioxidant and a thermoplastic resin are mixed and kneaded. A specific method of producing a thermoplastic resin composition is described below.

The antioxidant can conjointly be used in the present invention for this embodiment as mentioned above. For instance, the antioxidant, for example, a solid antioxidant, which is treated with the dibasic acid erythritol ester can be prepared by a dry method in which the ester is directly added to the solid antioxidant, and the surface treatment is conducted using a stirrer such as a Henschel mixer, a ball mill, an atomizer colloid mill or a Banbury mixer.

There are (1) a method in which from 0.01 to 10 parts by weight, per 100 parts by weight of the thermoplastic resin, of the solid antioxidant preliminarily treated by the dry method is stirred using a stirrer such as a homomixer, a mixing and grinding machine, a kneader, a Banbury mixer or an atomizer, and (2) a method in which per 100 parts by weight of the thermoplastic resin, from 0.01 to 10 parts by weight of the untreated solid antioxidant and less than 1 part by weight of the dibasic acid erythritol ester are stirred using a stirrer such as a homomixer, a mixing and grinding machine, a kneader, a Banbury mixer, a roll or an internal mixer. In the production of the same, the total amount of the dibasic acid erythritol ester is not necessarily used at the same time. A method in which a part thereof is used in the pretreatment and another part thereof is added in the production of the thermoplastic resin composition is also available. Further, the kneading temperature varies depending on the type of the thermoplastic resin. It is advisable that the kneading temperature is determined on the basis of the gelation temperature of the thermoplastic resin used.

When the resin molded article is produced using the composition of the present invention for the embodiment, it is not particularly difficult, and an ordinary method of molding a resin can be employed. For example, a resin molded article can easily be obtained by molding the thermoplastic resin composition produced by the above-mentioned method using a roll, a press, an extrusion-molding machine, a transfer-molding machine or an injection-molding machine. Naturally, the resulting resin molded article and molded product also fall within the scope of the present invention.

Besides, the thermoplastic resin composition of the present invention for the embodiment can contain one or more of a stabilizer, an organic or inorganic pigment, a dye, a plasticizer, a lubricant such as a fatty acid, a fatty acid salt or a fatty acid amide, a foam stabilizer, a foaming agent, a phosphate ester, antimony or bromine-type fire retardant, an ultraviolet absorber, an antistatic agent such as monoglyceride or an amine compound, and a nucleating agent (which accelerates crystallization of a polymer and provides a transparent molded article).

The present invention for the embodiment includes the resin composition as well as the resin molded article obtained by molding the same and the molded product. The present invention for this embodiment further includes the agent for improving the thermal aging resistance of the thermoplastic resin, which contains, at least two components, the dibasic acid erythritol ester and the filler or at least three components, these two components and as required the antioxidant (these plural components may be contained by being mixed or not by being mixed but by being separately combined for this purpose), and the thermoplastic resin intended.

The operations and effects of the diabasic acid erythrytol ester in the present Invention is in the following.

The operations and effects obtained by the diabasic acid erythrytol ester in the present invention are considered to be exhibited through the following mechanism. The dibasic acid erythritol ester used in the present invention can decrease the viscosity in the kneading because of a good wettability with an organic matrix of the thermoplastic resin or the like. Further, since it has in the end a side chain which exhibits a good wettability with the resin and the solvent component, a rigidity of a resin molded article after kneading and molding is not influenced. Further, the presence of the dibasic acid erythritol ester used improves the thermal aging resistance of the resin molded article. The thermal aging resistance is improved presumably because the dibasic acid erythritol ester forms a chelate with impurities contained in the catalyst or the filler used in the production of the thermoplastic resin, for example, metallic components such as iron, copper and the like, making it possible to provide the antioxidation effect or to decrease the amount of the antioxidant added as required which leads to the improvement of the thermal aging resistance of the resin composition.

In the present invention, at the same time as the agent for improving a thermal aging resistance of a thermoplastic resin, two or more selected in the group consisting of (i) said polyglycerin derivative, (ii) said N-acyl basic amino acid, and (iii) said dibasic acid erythritol ester can be used, and in such case the amount of said agent in total may be between 0.002 and 10 parts; and the amount of the filler when used is between 0.1 and 300 parts by weight, per 100 parts by weight of the thermoplastic resin.

The agent for improving a thermal aging resistance of a thermoplastic resin in the present invention can also be used together with the agent or agents other than those in the present invention. In such case, the amount used therefor can be figured out on the basis of the above informations, and/or the tests for the advance any tests.

EXAMPLES

The contents of the thermoplastic resin composition and the resin molded article obtained by molding the same in the present invention are specifically illustrated by referring to the following Examples and Comparative Examples. Incidentally, the following Examples do not limit the scope of the present invention, but are used only to clearly illustrate the contents of the present invention. Further, "parts" and "%" in Examples or Comparative Examples are on the weight basis.

Example 1

Production (1) of a Polyglycerin Derivative:

A reaction flask fitted with a thermometer, a stirrer, a nitrogen introduction inlet and a reflux condenser was charged with 50.0 parts of stearic acid, 87.88 parts of polyglycerin (Polyglycerin #500, made by Sakamoto Yakuhin Kogyo)and 0.01 parts of tetrabutyl titanate (made by Junsei Kagaku). The temperature was elevated to 160° C. in a nitrogen stream over the course of 4 hours, and the mixture was heated at 160° C. for 2 hours. Subsequently, the heating was conducted until the acid value of the reaction solution reached approximately 1 (mg·KOH/g). Then, the reaction solution was cooled to room temperature.

This reaction solution is hereinafter designated Pyglycerin Derivative PG-1. The polyglycerin derivative contained in Polyglycerin Derivative PG-1 had properties, a number average molecular weight of 764.41, an OH value of 547.18 (mg·KOH/g) and an acid value of 0.50.

Examples 2 to 11

Productions (2) to (11) of Polyglycerin Derivatives:

The reaction was conducted in the same manner as in Example 1 using the formulation shown in Table 1 until the acid value reached approximately 1 (mg·KOH/g) to obtain Polyglycerin Derivatives PG-2 to PG-11. Number average molecular weights, OH values and acid values of the resulting polyglycerin derivatives are shown in Table 1.

TABLE 1

| | Fatty acid | | | Polyglycerin | | | | Polyglycerin derivative | | | |
| | | | | | Poly- | | | | OH | | Number | |
| Example | Fatty acid | Reaction weight | Mols | Type | merization degree | OH number | Molar ratio* | Reaction weight | value after reaction | Acid value after reaction | average molecular weight | Sample No. |
|---|---|---|---|---|---|---|---|---|---|---|---|---|
| Example 1 | Stearic acid | 50.00 | 0.18 | Polyglycerin#500 | 6.70 | 8.70 | 1.0 | 87.88 | 547.18 | 0.50 | 764.41 | PG-1 |
| Example 2 | Stearic acid | 50.00 | 0.18 | Polyglycerin#500 | 6.70 | 8.70 | 3.0 | 29.50 | 235.83 | 0.80 | 1287.77 | PG-2 |
| Example 3 | Stearic acid | 50.00 | 0.18 | Polyglycerin#500 | 6.70 | 8.70 | 5.0 | 17.70 | 107.86 | 1.10 | 1811.35 | PG-3 |
| Example 4 | Stearic acid | 50.00 | 0.18 | Diglycerin | 2.00 | 4.00 | 3.0 | 9.74 | 55.00 | 1.30 | 958.63 | PG-4 |
| Example 5 | Stearic acid | 50.00 | 0.18 | Polyglycerin#310 | 4.20 | 6.20 | 3.0 | 18.16 | 147.15 | 0.80 | 1104.54 | PG-5 |
| Example 6 | Stearic acid | 50.00 | 0.18 | Polyglycerin#750 | 10.10 | 12.10 | 3.0 | 43.94 | 313.08 | 0.70 | 1543.53 | PG-6 |
| Example 7 | Oleic acid | 50.00 | 0.18 | Polyglycerin#500 | 6.70 | 8.70 | 1.0 | 88.50 | 548.59 | 0.60 | 762.01 | PG-7 |
| Example 8 | Oleic acid | 50.00 | 0.18 | Polyglycerin#500 | 6.70 | 8.70 | 3.0 | 29.50 | 235.83 | 0.60 | 1289.18 | PG-8 |
| Example 9 | Caprylic acid | 50.00 | 0.35 | Polyglycerin#500 | 6.70 | 8.70 | 5.0 | 34.67 | 168.92 | 1.30 | 1126.81 | PG-9 |
| Example 10 | Lauric acid | 50.00. | 0.25 | Polyglycerin#500 | 6.70 | 8.70 | 3.0 | 41.60 | 288.62 | 1.00 | 1042.88 | PG-10 |
| Example 11 | Isostearic acid | 50.00 | 0.18 | Polyglycerin#500 | 6.70 | 8.70 | 2.0 | 43.94 | 349.41 | 0.80 | 1028.45 | PG-11 |

*Molar ratio = moles of fatty acid/moles of polyglycerin

Comparative Example 1
Production (1) of a Polyester:

A reaction flask fitted with a thermometer, a stirrer, a nitrogen introduction inlet and a reflux condenser was charged with 100.0 parts of ricinoleic acid (made by Tokyo Kasei) and 0.01 parts of tetrabutyl titanate (made by Junsei Kagaku). The temperature was elevated to 160° C. in a nitrogen stream over the course of 4 hours, and the mixture was heated at 160° C. for 2 hours. Subsequently, the heating was conducted until the acid value of the reaction solution reached approximately 50 (mg·KOH/g). Then, the reaction solution was cooled to room temperature.

This reaction solution is hereinafter designated Polyester PE-1. The polyester contained in Polyester PE-1 had properties, a number average molecular weight of 1,120 and an acid value of 48.3.

Comparative Example 2
Production (2) of a Polyester:

A reaction flask fitted with a thermometer, a stirrer, a nitrogen introduction inlet and a reflux condenser was charged with 100.0 parts of 12-hydroxystearic acid (made by Junsei Kagaku) and 0.01 parts of tetrabutyl titanate (made by Junsei Kagaku). The temperature was elevated to 160° C. in a nitrogen stream over the course of 4 hours, and the mixture was heated at 160° C. for 2 hours. Subsequently, the heating was conducted until the acid value of the reaction solution reached approximately 50 (mg·KOH/g). Then, the reaction solution was cooled to room temperature.

This reaction solution is hereinafter designated Polyester PE-2. The polyester contained in Polyester PE-2 had properties, a number average molecular weight of 1,037 and an acid value of 54.0.

Comparative Example 3
Production (1) of a Comparative Polyglycerin Derivative:

A reaction flask fitted with a thermometer, a stirrer, a nitrogen introduction inlet and a reflux condenser was charged with 70.0 parts of Polyester PE-1, 31.25 parts of Polyglycerin #500 (made by Sakamoto Yakuhin Kogyo) and 0.01 parts of tetrabutyl titanate (made by Junsei Kagaku). The temperature was elevated to 160° C. in a nitrogen stream over the course of 4 hours, and the mixture was heated at 160° C. for 2 hours. Subsequently, the heating was conducted until the OH value of the reaction solution reached approximately 264 (mg·KOH/g). Then, the reaction solution was cooled to room temperature.

This reaction solution is hereinafter designated Glycerin Derivative PEG-1. The polyglycerin derivative contained in Polyglycerin PEG-1 had properties, a number average molecular weight of 1,570, an OH value of 258 and an acid value of 1.6.

Comparative Example 4
Production (2) of a Comparative Polyglycerin Derivative:

A reaction flask fitted with a thermometer, a stirrer, a nitrogen introduction inlet and a reflux condenser was charged with 70.0 parts of Polyester PE-2, 33.8 parts of Polyglycerin #500 (made by Sakamoto Yakuhin Kogyo) and 0.01 parts of tetrabutyl titanate (made by Junsei Kagaku). The temperature was elevated to 160° C. in a nitrogen stream over the course of 4 hours, and the mixture was heated at 160° C. for 2 hours. Subsequently, the heating was conducted until the OH value of the reaction solution reached approximately 280 (mg·KOH/g). Then, the reaction solution was cooled to room temperature.

This reaction solution is hereinafter designated Glycerin Derivative PEG-2. The glycerin derivative contained in Polyglycerin Derivative PEG-2 had properties, a number average molecular weight of 1,490, an OH value of 282 and an acid value of 1.5.

Example 12
Production 1 of a Thermoplastic Resin Composition and a Resin Molded Article:

Polyglycerin Derivative PG-1 (0.005 kg) obtained in Example 1, 0.005 kg of tetrakis{methylene-3(3,5-di-tert-butyl-4-hydroxyphenyl)propionate}methane (Irganox 1010, made by Ciba Geigy) as a solid antioxidant and a highly crystalline ethylene-propylene copolymer resin (using a commercial non-stabilized resin) which had been predried at 110° C. for 5 hours were mixed at 1,720 rpm for 5 minutes, kneaded with a biaxial kneader (PCM 30/30 Model, manufactured by Ikegai Iron Works, Ltd., cylinder temperature—C1=100° C., C2=220° C., C3=210° C., C4=210° C., C5=20° C., AD (adaptor temperature)=220° C., number of screw rotations=250 rpm, jet amount=8 kg/hour), and then pelletized. Using the resulting pellets, a fluidity test (melt flow) was conducted according to JIS K7210. Further, the resulting pellets were injection-molded according to JIS K7152 using an injection-molding machine (Clockner F 85, manufactured by The Japan Steel Works, Ltd., cylinder temperature—nozzle=220° C., front portion=220° C., center=210° C., rear portion=200° C., injection pressure=

360 kg/cm², injection speed=20%, mold temperature=45° C.) to prepare multi-purpose test pieces according to JIS K7139. The appearance of the resulting test pieces was evaluated through visual observation, and the flexural strength (yield value) was measured according to JIS K7203. Subsequently, the thermal aging resistance test was conducted according to JIS K7212, and the change in the appearance was observed. The results of the evaluation are shown in Table 2.

Conditions for the Fluidity Test:
230° C., 2.16 kgf, A method
Thermal Aging Resistance Test:
The crack of the surface was evaluated from the appearance (using 5 scores, 5 to 1, in order from the better condition).

polyglycerin derivative to produce thermoplastic resin compositions and resin molded articles (refer to Table 2).

Example 22

Example 12 was repeated except that Polyglycerin Derivative PG-7 was used as a polyglycerin derivative to produce a thermoplastic resin composition and a resin molded article (refer to Table 2).

Example 23

Example 12 was repeated except that Polyglycerin Derivative PG-7 was used as a polyglycerin derivative and 2,6-di-tert-butyl-p-cresol (Antage BHT, made by Kagakuchi Kagaku) as a solid antioxidant to produce a thermoplastic resin composition and a resin molded article (refer to Table 2).

TABLE 2

| | <Formulation> | | | | | | <Properties> | | |
| --- | --- | --- | --- | --- | --- | --- | --- | --- | --- |
| | | Solid | | Solid | | Polyglycerin derivative | | Melt flow | Flexural strength | Thermal aging resistance test (visual observation |
| Example | Resin* | antioxidant 1 | Amount | antioxidant 2 | Amount | Type | Amount | (g) | (kg/cm²) | of appearance) |
| Example 12 | 100 | IRGANOX1010 | 0.05 | | | PG-1 | 0.05 | 64 | 390 | 5 |
| Example 13 | 100 | IRGANOX1010 | 0.05 | | | PG-1 | 0.20 | 67 | 390 | 5 |
| Example 14 | 100 | IRGANOX1010 | 0.20 | | | PG-1 | 0.05 | 60 | 380 | 5 |
| Example 15 | 100 | BHT | 0.05 | | | PG-1 | 0.05 | 63 | 390 | 5 |
| Example 16 | 100 | BHT | 0.20 | | | PG-1 | 0.05 | 64 | 380 | 5 |
| Example 17 | 100 | IRGANOX1010 | 0.05 | | | PG-2 | 0.05 | 58 | 380 | 5 |
| Example 18 | 100 | IRGANOX1010 | 0.05 | | | PG-3 | 0.05 | 59 | 390 | 4 |
| Example 19 | 100 | IRGANOX1010 | 0.05 | | | PG-8 | 0.05 | 59 | 380 | 5 |
| Example 20 | 100 | IRGANOX1010 | 0.05 | | | PG-9 | 0.05 | 58 | 390 | 4 |
| Example 21 | 100 | IRGANOX1010v | 0.05 | | | PG-10 | 0.05 | 62 | 390 | 5 |
| Example 22 | 100 | IRGANOX1010 | 0.05 | | | PG-7 | 0.05 | 61 | 390 | 5 |
| Example 23 | 100 | BHT | 0.05 | | | PG-7 | 0.05 | 64 | 390 | 5 |
| Example 24 | 100 | IRGANOX1010 | 0.05 | MARK2112 | 0.05 | PG-7 | 0.05 | 58 | 390 | 5 |
| Example 25 | 100 | IRGANOX1010 | 0.05 | MARK2112 | 0.20 | PG-7 | 0.05 | 59 | 390 | 5 |

Resin* ethylene-propylene copolymer

Example 13

Example 12 was repeated except that 0.02 kg of Polyglycerin Derivative PG-1 were used instead of 0.005 kg of the same to produce a thermoplastic resin composition and a resin molded article (refer to Table 2).

Example 14

Example 12 was repeated except that 0.02 kg of tetrakis{methylene-3(3,5-di-tert-butyl-4-hydroxyphenyl) propionate}methane (Irganox 1010, made by Ciba Geigy) were used as a solid antioxidant instead of 0.005 kg of the same to produce a thermoplastic resin composition and a resin molded article (refer to Table 2).

Example 15

Example 12 was repeated except that 2,6-di-tert-buty-p-cresol (Antage BHT, made by Kawaguchi Kagaku) was used as a solid antioxidant to produce a thermoplastic resin composition and a resin molded article (refer to Table 2).

Example 16

Example 12 was repeated except that 0.02 kg of 2,6-di-tert-buty-p-cresol (Antage BHT, made by Kawaguchi Kagaku) were used as a solid antioxidant instead of 0.005 kg of the same to produce a thermoplastic resin composition and a resin molded article (refer to Table 2).

Examples 17 to 21

Example 12 was repeated except that Polyglycerin Derivatives PG-2, PG-3 and PG-8 to PG-10 were used as a

Example 24

Example 12 was repeated except that Polyglycerin Derivative PG-7 was used as a polyglycerin derivative and 0.005 kg of tetrakis{methylene-3(3,5-di-tert-butyl-4-hydroxyphenyl)propionate}methane (Irganox 1010, made by Ciba Geigy) and 0.005 kg of tris(2,4-di-tert-butyl) phosphate (Mark 2112, made by Asaki Denka) as solid antioxidants to produce a thermoplastic resin composition and a resin molded article (refer to Table 2).

Example 25

Example 12 was repeated except that Polyglycerin Derivative PG-7 was used as a polyglycerin derivative and 0.005 kg of tetrakis{methylene-3(3,5-di-tert-butyl-4-hydroxyphenyl)propionate}methane (Irganox 1010, made by Ciba Geigy) and 0.02 kg of tris(2,4-di-tert-butyl) phosphate (Mark 2112, made by Asaki Denka) as solid antioxidants to produce a thermoplastic resin composition and a resin molded article (refer to Table 2).

Comparative Example 5

Example 12 was repeated except that a polyglycerin derivative and a solid antioxidant were not used to produce a thermoplastic resin composition and a resin molded article (refer to Table 3).

TABLE 3

| | <Formulation> | | | <Additive> | | <Properties> | | Thermal aging resistance test (Visual observation of appearance) |
|---|---|---|---|---|---|---|---|---|
| Comparative Example | Resin* | Solid antioxidant 1 | Amount | Type | Amount | Melt flow (g) | Flexural strength (kg/cm²) | |
| Comparative Example 5 | 100 | | | | | 50 | 380 | 1 |
| Comparative Example 6 | 100 | IRGANOX1010 | 0.20 | | | 26 | 380 | 3 |
| Comparative Example 7 | 100 | IRGANOX1010 | 0.05 | | | 29 | 390 | 3 |
| Comparative Example 8 | 100 | | | PG-1 | 0.05 | 49 | 380 | 2 |
| Comparative Example 9 | 100 | IRGANOX1010 | 0.20 | PEG-1 | 0.05 | 52 | 380 | 3 |
| Comparative Example 10 | 100 | IRGANOX1010 | 0.05 | PEG-1 | 0.05 | 54 | 380 | 3 |
| Comparative Example 11 | 100 | IRGANOX1010 | 0.50 | PEG-1 | 0.50 | 56 | 380 | 3 |
| Comparative Example 12 | 100 | IRGANOX1010 | 0.05 | PEG-2 | 0.05 | 55 | 380 | 3 |
| Comparative Example 13 | 100 | IRGANOX1010 | 0.05 | Glycerin monostearic acid ester | 0.05 | 48 | 350 | 2 |
| Comparative Example 14 | 100 | IRGANOX1010 | 0.05 | Calcium stearate | 0.05 | 49 | 350 | 2 |
| Comparative Example 15 | 100 | IRGANOX1010 | 0.05 | Ethylenebisstearic acid amide | 0.05 | 50 | 360 | 2 |

Resin* ethylene-propylene copolyme

Comparative Example 6

Example 12 was repeated except that a polyglycerin derivative was not used and 0.02 kg of a solid antioxidant were used instead of 0.005 kg of the same to produce a thermoplastic resin composition and a resin molded article (refer to Table 3).

Comparative Example 7

Example 12 was repeated except that a polyglycerin derivative was not used to produce a thermoplastic resin composition and a resin molded article (refer to Table 3).

Comparative Example 8

Example 12 was repeated except that an antioxidant was not used to produce a thermoplastic resin composition and a resin molded article (refer to Table 3).

Comparative Example 9

Example 12 was repeated except that 0.02 kg of a solid antioxidant were used instead of 0.005 kg of the same and PEG-1 formed in Comparative Example 3 instead of Polyglycerin Derivative PG-1 to produce a thermoplastic resin composition and a resin molded article (refer to Table 3).

Comparative Example 10

Example 12 was repeated except that PEG-1 formed in Comparative Example 3 was used instead of Polyglycerin Derivative PG-1 to produce a thermoplastic resin composition and a resin molded article (refer to Table 3).

Comparative Example 11

Example 12 was repeated except that 0.05 kg of a solid antioxidant were used instead of 0.005 kg of the same and 0.05 kg of PEG-1 formed in Comparative Example 3 instead of 0.005 kg of Polyglycerin Derivative PG-1 to produce a thermoplastic resin composition and a resin molded article (refer to Table 3).

Comparative Example 12

Example 12 was repeated except that PEG-2 formed in Comparative Example 3 was used instead of Polyglycerin Derivative PG-1 to produce a thermoplastic resin composition and a resin molded article (refer to Table 3).

Comparative Examples 13 to 15

Example 12 was repeated except that glycerin monostearic acid ester (made by Tokyo Kasei), calcium stearate (made by Tokyo Kasei) or ethylenebisstearic acid amide (made by Tokyo Kasei) was used instead of Polyglycerin Derivative PG-1 to produce a thermoplastic resin composition and a resin molded article (refer to Table 3).

Example 26

Production 2 of a Thermoplastic resin Composition and a Resin Molded Article:

Polyglycerin Derivative PG-1 (0.02 kg) obtained in Example 2, 0.005 kg of tetrakis{methylene-3(3,5-di-tert-butyl-4-hydroxyphenyl)propionate}methane (Irganox 1010, made by Ciba Geigy), 2 kg of talc (High Filler #5000PJ, made by Matsumura Sangyo, average particle diameter 1.4 to 1.8 $\mu$m) and 10 kg of a highly crystalline ethylene-propylene copolymer resin (using a commercial non-stabilized resin) which had been predried at 110° C. for 5 hours were mixed at 1,720 rpm for 5 minutes, kneaded with a biaxial kneader (PCM 30/30 Model, manufactured by Ikegai Iron Works, Ltd., cylinder temperature—C1=100° C., C2=220° C., C3=210° C., C4=210° C., C5=20° C., AD (adaptor temperature)=220° C., number of screw rotations= 250 rpm, jet amount=8 kg/hour), and then pelletized. Using the resulting pellets, a fluidity test (melt flow) was conducted according to JIS K7210. Further, the resulting pellets were injection-molded according to JIS K7152 using an injection-molding machine (Clockner F 85, manufactured by The Japan Steel Works, Ltd., cylinder temperature—nozzle= 220° C., front portion=220° C., center=210° C., rear portion=200° C., injection pressure=360 kg/cm², injection speed=20%, mold temperature=45° C.) to prepare multi-purpose test pieces according to JIS K7139. The appearance of the resulting test pieces was evaluated through visual observation, and the flexural strength (yield value) was measured according to JIS K7203. Subsequently, the thermal aging resistance test was conducted according to JIS K7212, and the change in the appearance was observed. The results of the evaluation are shown in Table 4.

Conditions for the Fluidity Test:
230° C., 2.16 kgf, A method
Thermal Aging Resistance Test:
The crack of the surface was evaluated from the appearance (using 5 scores, 5 to 1, in order from the better condition).

TABLE 4

| Example | Resin* | Talc | Solid antioxidant 1 | Amount | Solid antioxidant 2 | Amount | Polyglycerin derivative Type | Amount | Melt flow (g) | Flexural strength (kg/cm$^2$) | Thermal aging resistance test (Visual observation of appearance) |
|---|---|---|---|---|---|---|---|---|---|---|---|
| Example 26 | 100 | 20 | IRGANOX1010 | 0.05 | | | PG-1 | 0.20 | 37 | 460 | 5 |
| Example 27 | 100 | 20** | IRGANOX1010 | 0.05 | | | PG-1 | 0.20 | 38 | 460 | 5 |
| Example 28 | 100 | 20 | IRGANOX1010 | 0.05 | | | PG-1 | 0.05 | 34 | 460 | 5 |
| Example 29 | 100 | 20 | IRGANOX1010 | 0.20 | | | PG-1 | 0.05 | 35 | 460 | 5 |
| Example 30 | 100 | 20 | BHT | 0.05 | | | PG-1 | 0.20 | 38 | 460 | 5 |
| Example 31 | 100 | 20 | BHT | 0.20 | | | PG-1 | 0.20 | 36 | 460 | 5 |
| Example 32 | 100 | 20 | IRGANOX1010 | 0.05 | | | PG-2 | 0.20 | 34 | 450 | 4 |
| Example 33 | 100 | 20 | IRGANOX1010 | 0.05 | | | PG-3 | 0.20 | 27 | 450 | 4 |
| Example 34 | 100 | 20 | IRGANOX1010 | 0.05 | | | PG-4 | 0.20 | 29 | 460 | 5 |
| Example 35 | 100 | 20 | IRGANOX1010 | 0.05 | | | PG-5 | 0.20 | 30 | 460 | 5 |
| Example 36 | 100 | 20 | IRGANOX1010 | 0.05 | | | PG-6 | 0.20 | 34 | 450 | 5 |
| Example 37 | 100 | 20 | IRGANOX1010 | 0.05 | | | PG-11 | 0.20 | 29 | 450 | 4 |
| Example 38 | 100 | 20 | IRGANOX1010 | 0.05 | | | PG-7 | 0.20 | 35 | 460 | 5 |
| Example 39 | 100 | 20 | BHT | 0.05 | | | PG-7 | 0.20 | 36 | 460 | 5 |
| Example 40 | 100 | 20 | IRGANOX1010 | 0.05 | MARK2112 | 0.05 | PG-7 | 0.20 | 34 | 460 | 5 |
| Example 41 | 100 | 20 | IRGANOX1010 | 0.05 | MARK2112 | 0.20 | PG-7 | 0.20 | 33 | 460 | 5 |

*ethylene-propylene copolymer
**using talc treated with a polyglycerin derivative

Example 27

One part of Polyglycerin Derivative PG-1 obtained in Example 2 was added to 200 parts of toluene, and the solution was mixed with 100 parts of talc (High Filler #5000PJ, made by Matsumura Sangyo, average particle diameter 1.4 to 1.8 μm). Toluene was then distilled off under reduced pressure to form a treated powder. Ten kilograms of a highly crystalline ethylene-propylene copolymer resin (using a commercial non-stabilized resin) which had been predried at 110° C. for 5 hours were mixed with 2.02 kg of the above-treated talc and 0.005 kg of tetrakis{methylene-3(3,5-di-tert-butyl-4-hydroxyphenyl)propionate}methane (Irganox 1010, made by Ciba Geigy) as a solid antioxidant at 1,720 rpm for 5 minutes using a Henschell mixer #301. The mixture was kneaded with a biaxial kneader (PCM 30/30 Model, manufactured by Ikegai Iron Works, Ltd., cylinder temperature—C1=100° C., C2=220° C., C3=210° C., C4=210° C., C5=20° C., AD (adaptor temperature)=220° C., number of screw rotations=250 rpm, jet amount=8 kg/hour), and then pelletized. Using the resulting pellets, a fluidity test was conducted according to JIS K7210. Further, the resulting pellets were injection-molded according to JIS K7152 using an injection-molding machine (Clockner F 85, manufactured by The Japan Steel Works, Ltd., cylinder temperature—nozzle=220° C., front portion=220° C., center=210° C., rear portion=200° C., injection pressure= 360 kg/cm$^2$, injection speed=20%, mold temperature=45° C.) to prepare multi-purpose test pieces according to JIS K7139. The appearance of the resulting test pieces was evaluated through visual observation, and the flexural strength (yield value) was measured according to JIS K7203. Subsequently, the thermal aging resistance test was conducted according to JIS K7212, and the change in the appearance was observed. The results of the evaluation are shown in Table 4.

Example 28

Example 26 was repeated except that 0.005 kg of Polyglycerin Derivative PG-1 were used instead of 0.02 kg thereof to produce a thermoplastic resin composition and a resin molded article (refer to Table 4).

Example 29

Example 26 was repeated except that 0.02 kg of tetrakis{methylene-3(3,5-di-tert-butyl-4-hydroxyphenyl) propionate}methane (Irganox 1010, made by Ciba Geigy) were used as a solid antioxidant instead of 0.005 kg thereof and 0.005 kg of Polyglycerin Derivative PG-1 were used instead of 0.02 kg thereof to produce a thermoplastic resin composition and a resin molded article (refer to Table 4).

Example 30

Example 26 was repeated except that 2,6-di-tert-butyl-p-cresol (Antage BHT, made by Kawaguchi Kagaku) was used as a solid antioxidant to produce a thermoplastic resin composition and a resin molded article (refer to Table 4).

Example 31

Example 26 was repeated except that 0.02 kg of 2,6-di-tert-butyl-p-cresol (Antage BHT, made by Kawaguchi Kagaku) was used instead of 0.005 kg thereof as a solid antioxidant to produce a thermoplastic resin composition and a resin molded article (refer to Table 4).

Examples 32 to 37

Example 26 was repeated except that Polyglycerin Derivatives PG-2 to PG-6 and PG-11 were used as a polyglycerin derivative to produce a thermoplastic resin composition and a resin molded article (refer to Table 4).

Example 38

Example 26 was repeated except that Polyglycerin Derivatives PG-7 was used as a polyglycerin derivative to produce a thermoplastic resin composition and a resin-molded article (refer to Table 4).

Example 39

Example 26 was repeated except that Polyglycerin Derivatives PG-7 was used as a polyglycerin derivative and 2,6-di-tert-butyl-p-cresol (Antage BHT, made by Kawaguchi Kagaku) as a solid antioxidant to produce a thermoplasticresin composition and a resin molded article (refer to Table 4).

Example 40

Example 26 was repeated except that Polyglycerin Derivative PG-7 was used as a polyglycerin derivative, 0.005 kg of tetrakis{methylene-3(3,5-di-tert-butyl-4-hydroxyphenyl)propionate}methane (Irganox 1010, made by Ciba Geigy) and 0.005 kg of tris(2,4-di-tert-butyl) phosphite (Mark 2112, made by Asahi Danka) as solid antioxidants to produce a thermoplastic resin composition and a resin molded article (refer to Table 4).

Example 41

Example 26 was repeated except that Polyglycerin Derivative PG-7 was used as a polyglycerin derivative and 0.005 kg of tetrakis{methylene-3(3,5-di-tert-butyl-4-hydroxyphenyl)propionate}methane (Irganox 1010, made by Ciba Geigy) and 0.02 kg of tris(2,4-di-tert-butyl) phosphite (Mark 2112, made by Asahi Danka) were used as solid antioxidants to produce a thermoplastic resin composition and a resin molded article (refer to Table 4).

Comparative Example 16

Example 26 was repeated except that a polyglycerin derivatives and a solid antioxidant were not used to produce a thermoplastic resin composition and a resin molded article. The results are shown in Table 5.

Comparative Example 17

Example 26 was repeated except that a polyglycerin derivative was not used and 0.02 kg of a solid antioxidant were used instead of 0.005 kg of the same to produce a thermoplastic resin composition and a resin molded article (refer to Table 5).

Comparative Example 18

Example 26 was repeated except that a polyglycerin derivative was not used and 0.05 kg of a solid antioxidant were used instead of 0.005 kg of the same to produce a thermoplastic resin composition and a resin molded article (refer to Table 5).

Comparative Example 19

Example 26 was repeated except that an antioxidant was not used to produce a thermoplastic resin composition and a resin molded article (refer to Table 5).

Comparative Example 20

Example 27 was repeated except that an antioxidant was not used to produce a thermoplastic resin composition and a resin molded article (refer to Table 5).

Comparative Example 21

Example 26 was repeated except that 0.02 kg of a solid antioxidant were used instead of 0.005 kg of the same and PEG-1 formed in Comparative Example 3 instead of Polyglycerin Derivative PG-1 to produce a thermoplastic resin composition and a resin molded article (refer to Table 5).

Comparative Example 22

Example 26 was repeated except that PEG-1 formed in Comparative Example 3 was used instead of Polyglycerin Derivative PG-1 to produce a thermoplastic resin composition and a resin molded article (refer to Table 5).

Comparative Example 23

Example 26 was repeated except that PEG-2 formed in Comparative Example 4 was used instead of Polyglycerin Derivative PG-1 to produce a thermoplastic resin composition and a resin molded article (refer to Table 5).

Comparative Examples 24 to 28

Example 26 was repeated except that glycerin monostearic acid ester (made by Tokyo Kasei), calcium stearate (made by Tokyo Kasei), stearic acid (made by Junsei Kagaku), stearic acid amide (made by Tokyo Kasei) or ethylenebisstearic acid amide (made by Tokyo Kasei) was used instead of the polyglycerin derivative to produce a thermoplastic resin composition and a resin molded article (refer to Table 5).

As is apparent from the results in Tables 2 and 3, it is found that the polyglycerin derivative alone used in the present invention provides a small effect of the thermal aging resistance, that the combined use of this and the antioxidant, especially the solid antioxidant provides a syn-

TABLE 5

| | <Formulation> | | | | <Properties> | | | |
| --- | --- | --- | --- | --- | --- | --- | --- | --- |
| Comparative Example | Resin* | Talc | Solid antioxidant 1 | Amount | Additive Type | Amount | Melt flow (g) | Flexural strength (kg/cm$^2$) | Thermal aging resistance test (Visual observation of appearance) |
| Comparative Example 16 | 100 | 20 | | | | | 18 | 450 | 1 |
| Comparative Example 17 | 100 | 20 | IRGANOX1010 | 0.20 | | | 19 | 450 | 2 |
| Comparative Example 18 | 100 | 20 | IRGANOX1010 | 0.05 | | | 17 | 450 | 2 |
| Comparative Example 19 | 100 | 20 | | | PG-1 | 0.20 | 38 | 450 | 2 |
| Comparative Example 20 | 100 | 20** | | | PG-1 | 0.20 | 36 | 460 | 2 |
| Comparative Example 21 | 100 | 20 | IRGANOX1010 | 0.20 | PEG-1 | 0.20 | 24 | 460 | 2 |
| Comparative Example 22 | 100 | 20 | IRGANOX1010 | 0.05 | PEG-1 | 0.20 | 27 | 450 | 2 |
| Comparative Example 23 | 100 | 20 | IRGANOX1010 | 0.05 | PEG-2 | 0.20 | 26 | 460 | 2 |
| Comparative Example 24 | 100 | 20 | IRGANOX1010 | 0.05 | Glycerin monostearic acid ester | 0.20 | 25 | 430 | 2 |
| Comparative Example 25 | 100 | 20 | IRGANOX1010 | 0.05 | Calcium stearate | 0.20 | 24 | 420 | 1 |
| Comparative Example 26 | 100 | 20 | IRGANOX1010 | 0.05 | Stearic acid | 0.20 | 21 | 430 | 1 |
| Comparative Example 27 | 100 | 20 | IRGANOX1010 | 0.05 | Stearic acid amide | 0.20 | 25 | 410 | 1 |
| Comparative Example 28 | 100 | 20 | IRGANOX1010 | 0.05 | Ethylenebisstearic acid amide | 0.20 | 22 | 420 | 1 |

*ethylene-propylene copolymer
**using talc treated with a polyglycerin derivative ergistic effect of the thermal aging resistance, and further that the lubricant (glycerin monostearic acid ester, calcium stearate or ethylenebisstearic acid amide) ordinarily used decreases properties, especially strength properties, and gives almost no effect of improving the thermal aging resistance. It is also found that the condensate of polyglycerin and the hydroxycarboxylic acid polycondensate (polyester) less decreases the properties, but provides a small effect of the thermal aging resistance in comparison with the polyglycerin fatty acid ester which is a polyglycerin derivative used in the present invention.

As is apparent from the results in Tables 4 and 5, it is found that the polyglycerin derivative alone used in the present invention provides a small effect of the thermal aging resistance, but the combined use of this and the antioxidant, especially the solid antioxidant provides a synergistic effect of the thermal aging resistance, and further that the lubricant (glycerin monostearic acid ester, calcium stearate or ethylenebisstearic acid amide) ordinarily used decreases properties, especially strength properties, and gives almost no effect of improving the thermal aging resistance. It is also found that the condensate of the polyglycerin and the polyester less decreases the properties, but provides a small effect of the thermal aging resistance in comparison with the polyglycerin derivative which is used in the present invention. Still further, it is found that the use of the filler such as talc or the like provides a remarkably high effect in comparison with Tables 2 and 3.

As being clear from the above explanations on the effects for the thermoplastic resin composition incorporating the polyglycerin derivative in the embodiment in the present invention, the thermoplastic resin composition comprising the polyglycerin derivative, the antioxidant, the thermoplastic resin and as required, the filler in the present invention extremely improves the thermal aging resistance when a resin molded article is formed by molding the same.

Example 42
Synthesis 42 of an N-acyl Basic Amino Acid:

Lysine stearate (35.0 g) was suspended in 300 ml of xylene using a 600-milliliter reaction vessel. The suspension was boiled through heating, and water formed through azeotropic distillation was removed outside the system. After it was identified that a stoichiometric amount of water was removed (reaction time 3 hours), the residue was cooled. Crystals precipitated were separated through filtration, and washed with 100 ml of a 50% ethanol solution. The crystals were recrystallized from a sulfuric acid aqueous solution to obtain 28.8 g of $N^\epsilon$-stearoyl lysine (yield 85.9%). This is designated Derivative A.

Example 43
Synthesis 43 of an N-acyl Basic Amino Acid:

Lysine octanoate (35.0 g) was suspended in 300 ml of xylene using a 600-milliliter reaction vessel. The suspension was boiled through heating, and water formed through azeotropic distillation was removed outside the system. After it was identified that a stoichiometric amount of water was removed (reaction time 3 hours), the residue was cooled. Crystals precipitated were separated through filtration, and washed with 100 ml of a 50% ethanol solution. The crystals were recrystallized from a sulfuric acid aqueous solution to obtain 26.9 g of $N^\epsilon$-octanoyl lysine (yield 81.9%). This is designated Derivative B.

Example 44

Synthesis 44 of an N-acyl Basic Amino Acid:

ornithine oleate (35.0 g) was suspended in 300 ml of xylene using a 600-milliliter reaction vessel. The suspension was boiled through heating, and water formed through azeotropic distillation was removed outside the system. After it was identified that a stoichiometric amount of water was removed (reaction time 3 hours), the residue was cooled. Crystals precipitated were separated through filtration, and washed with 100 ml of a 50% ethanol solution. The crystals were recrystallized from a sulfuric acid aqueous solution to obtain 29.1 g of $N^\delta$-oleyl ornithine (yield 86.9%). This is designated Derivative B.

Example 45

Production 1 of a Thermoplastic Resin Composition and a Resin Molded Article:

$N^\epsilon$-lauroyl lysine (Feimex L-12, made by Ajinomoto Co., Inc. 0.02 kg) as an N-acyl basic amino acid, 2 kg of talc (High Filler #5000PJ, made by Matsumura Sangyo, average particle diameter 1.4 to 1.8 μm) and 10 kg of a highly crystalline ethylene-propylene copolymer resin (using a commercial non-stabilized resin) which had been predried at 110° C. for 5 hours were mixed at 1,720 rpm for 5 minutes, kneaded with a biaxial kneader (PCM 30/30 Model, manufactured by Ikegai Iron Works, Ltd., cylinder temperature—C1=100° C., C2=220° C., C3=210° C., C4=210° C., C5=20° C., AD (adaptor temperature)=220° C., number of screw rotations=250 rpm, jet amount=8 kg/hour), and then pelletized. Using the resulting pellets, a fluidity test was conducted according to JIS K7210. Further, the resulting pellets were injection-molded according to JIS K7152 using an injection-molding machine (Clockner F 85, manufactured by The Japan Steel Works, Ltd., cylinder temperature—nozzle=220° C., front portion=220° C., center=210° C., rear portion 200° C., injection pressure=360 kg/cm$^2$, injection speed=20%, mold temperature=45° C.) to prepare multipurpose test pieces according to JIS K7139. The appearance of the resulting test pieces was evaluated through visual observation, and the flexural strength (yield value) was measured according to JIS K7203. Subsequently, the thermal aging resistance test was conducted according to JIS K7212, and the change in the appearance was observed. The results of the evaluation are shown in Table 6.

Conditions for the Melt Flow (Fluidity) Test:

230° C., 2.16 kgf, A method, according to JIS K7210
Thermal Aging Resistance Test:
The crack of the surface was evaluated from the appearance (using 5 scores, 5 to 1, in order from the better condition).

TABLE 6

| <Formulation> Example (Comparative Example) | Ethylene propylene copolymer resin | (Unit parts by weight)<Properties> | | | Melt flow (g) | Flexural strength (kg/cm²) | Thermal aging resistance test (Visual observation of appearance) |
|---|---|---|---|---|---|---|---|
| | | Talc | Additives N-acyl basic amino acid and the like | Amount | | | |
| Example 45 | 100 | 20 | Feimex L-12 | 0.20 | 39 | 460 | 5 |
| Example 46 | 100 | 20 | Derivative A | 0.20 | 40 | 460 | 5 |
| Example 47 | 100 | 20 | Derivative B | 0.20 | 35 | 460 | 5 |
| Example 46 | 100 | 20 | Derivative C | 0.20 | 38 | 460 | 5 |
| Example 49 | 100 | 20 | Feimex L-12 | 0.05 | 32 | 460 | 4 |
| Example 50 | 100 | 20 | Feimex L-12 | 1.00 | 41 | 450 | 4 |
| Comparative Example 29 | 100 | 20 | — | — | 18 | 450 | 1 |
| Comparative Example 30 | 100 | 20 | Glycerin monostearic acid ester | 0.20 | 21 | 430 | 1 |
| Comparative Example 31 | 100 | 20 | Calcium stearate | 0.20 | 22 | 420 | 2 |
| Comparative Example 32 | 100 | 20 | Ethylenebisstearic acid amide | 0.20 | 24 | 420 | 1 |

Example 46

Example 45 was repeated except that 0.02 kg of Derivative A obtained in Example 42 were used as an N-acyl basic amino acid instead of 0.02 kg of N$^\epsilon$-lauroyl lysine (Feimex L-12, made by Ajinomoto Co., Inc.) to produce a thermoplastic resin composition and a resin molded article (refer to Table 6).

Example 47

Example 45 was repeated except that 0.02 kg of Derivative B obtained in Example 43 were used as an N-acyl basic amino acid instead of 0.02 kg of N$^\epsilon$-lauroyl lysine (Feimex L-12, made by Ajinomoto Co., Inc.) to produce a thermoplastic resin composition and a resin molded article (refer to Table 6).

Example 48

Example 45 was repeated except that 0.02 kg of Derivative C obtained in Example 44 were used as an N-acyl basic amino acid instead of 0.02 kg of N$^\epsilon$-lauroyl lysine (Feimex L-12, made by Ajinomoto Co., Inc.) to produce a thermoplastic resin composition and a resin molded article (refer to Table 6).

Example 49

Example 45 was repeated except that 0.005 kg of N$^\epsilon$-lauroyl lysine (Feimex L-12, made by Ajinomoto Co., Inc.) were used instead of 0.02 kg of the same compound to produce a thermoplastic resin composition and a resin molded article (refer to Table 6).

Example 50

Example 45 was repeated except that 0.1 kg of N$^\epsilon$-lauroyl lysine (Feimex L-12, made by Ajinomoto Co., Inc.) were used instead of 0.02 kg of the same compound to produce a thermoplastic resin composition and a resin molded article (refer to Table 6).

Comparative Example 29

Example 45 was repeated except that N$^\epsilon$-lauroyl lysine (Feimex L-12, made by Ajinomoto Co., Inc.) was not used to produce a thermoplastic resin composition and a resin molded article (refer to Table 6).

Comparative Examples 30 to 32

Example 45 was repeated except that glycerin monostearic acid ester (made by Tokyo Kasei), calcium stearate (made by Tokyo Kasei) or ethylenebisstearic acid amide (made by Tokyo Kasei) was used instead of N$^\epsilon$-lauroyl lysine (Feimex L-12, made by Ajinomoto Co., Inc.) to produce a thermoplastic resin composition and a resin molded article (refer to Table 6).

Example 51

Production 2 of a Thermoplastic Resin Composition and a Resin Molded Article:

N$^\epsilon$-lauroyl lysine (Feimex L-12, made by Ajinomoto Co., Inc. 0.02 kg) as an N-acyl basic amino acid, 0.005 kg of tetrakis{methylene-3(3,5-di-tert-butyl-4-hydroxyphenyl) propionate}methane (Irganox 1010, made by Ciba Geigy) as a solid antioxidant, 2 kg of talc (High Filler #5000PJ, made by Matsumura Sangyo, average particle diameter 1.4 to 1.8 μm) and 10 kg of a highly crystalline ethylene-propylene copolymer resin (using a commercial non-stabilized resin) which had been predried at 110C for 5 hours were mixed at 1,720 rpm for 5 minutes, kneaded with a biaxial kneader (PCM 30/30 Model, manufactured by Ikegai Iron Works, Ltd., cylinder temperature—C1=100° C., C2=220° C., C3=210° C., C4=210° C., C5=20° C., AD (adaptor temperature)=220° C., number of screw rotations=250 rpm, jet amount=8 kg/hour), and then pelletized. Using the resulting pellets, a fluidity test was conducted according to JIS K7210. Further, the resulting pellets were injection-molded according to JIS K7152 using an injection-molding machine (Clockner F 85, manufactured by The Japan Steel Works, Ltd., cylinder temperature—nozzle=220° C., front portion=220° C., center=210° C., rear portion=200° C., injection pressure=360 kg/cm², injection speed=20%, mold temperature=45° C.) to prepare multi-purpose test pieces according to JIS K7139. The appearance of the resulting test pieces was evaluated through visual observation, and the flexural strength (yield value) was measured according to JIS K7203. Subsequently, the thermal aging resistance test was conducted according to JIS K7212, and the change in the appearance was observed. The results of the evaluation are shown in Table 7.

Conditions for the Melt Flow Test:

230° C., 2.16 kgf, A method, according to JIS K7210

Thermal Aging Resistance Test:

The crack of the surface was evaluated from the appearance (using 5 scores, 5 to 1, in order from the better condition).

TABLE 7

| Example (Comparative Example) | Ethylene propylene copolymer resin | Talc | Solid antioxidant Antioxidant 1 | Amount | Solid antioxidant Antioxidant 2 | Amount | Additives N-acyl basic amino acid and the like | Amount | Melt flow (g) | Flexural strength (kg/cm²) | Thermal aging resistance test (Visual observation of appearance) |
|---|---|---|---|---|---|---|---|---|---|---|---|
| Example 51 | 100 | 20 | IRGANOZ101 | 0.05 | | | Feimex L-12 | 0.20 | 36 | 460 | 5 |
| Example 52 | 100 | 20 | IRGANOZ101 | 0.05 | | | Derivative A | 0.20 | 34 | 460 | 5 |
| Example 53 | 100 | 20 | IRGANOZ101 | 0.05 | | | Derivative B | 0.20 | 31 | 460 | 5 |
| Example 54 | 100 | 20 | IRGANOZ101 | 0.05 | | | Derivative C | 0.20 | 36 | 460 | 5 |
| Example 55 | 100 | 20 | IRGANOZ101 | 0.05 | | | Feimex L-12 | 0.05 | 33 | 460 | 4 |
| Example 56 | 100 | 20 | BHT | 0.05 | | | Feimex L-12 | 0.20 | 38 | 460 | 4 |
| Example 57 | 100 | 20 | IRGANOZ101 | 0.025 | MARK2112 | 0.025 | Feimex L-12 | 0.20 | 35 | 460 | 5 |
| Comparative Example 33 | 100 | 20 | IRGANOZ101 | 0.05 | | | — | | 19 | 450 | 2 |
| Comparative Example 34 | 100 | 20 | IRGANOZ101 | 0.05 | | | Glycerin monostearic acid ester | 0.20 | 25 | 430 | 2 |
| Comparative Example 35 | 100 | 20 | IRGANOZ101 | 0.05 | | | Calcium stearate | 0.20 | 24 | 420 | 1 |
| Comparative Example 36 | 100 | 20 | IRGANOZ101 | 0.05 | | | Ethylenebisstearic acid amide | 0.20 | 22 | 420 | 1 |

Example 52

Example 51 was repeated except that 0.02 kg of Derivative A obtained in Example 42 were used as an N-acyl basic amino acid instead of $N^\epsilon$-lauroyl lysine (Feimex L-12, made by Ajinomoto Co., Inc.) to produce a thermoplastic resin composition and a resin molded article (refer to Table 7).

Example 53

Example 51 was repeated except that 0.02 kg of Derivative B obtained in Example 43 were used as an N-acyl basic amino acid instead of $N^\epsilon$-lauroyl lysine (Feimex L-12, made by Ajinomoto Co., Inc.) to produce a thermoplastic resin composition and a resin molded article (refer to Table 7).

Example 54

Example 51 was repeated except that 0.02 kg of Derivative C obtained in Example 43 were used as an N-acyl basic amino acid instead of $N^\epsilon$-lauroyl lysine (Feimex L-12, made by Ajinomoto Co., Inc.) to produce a thermoplastic resin composition and a resin molded article (refer to Table 7).

Example 55

Example 51 was repeated except that 0.005 kg of $N^\epsilon$-lauroyl lysine (Feimex L-12, made by Ajinomoto Co., Inc.) were used instead of 0.02 kg of the same compound to produce a thermoplastic resin composition and a resin molded article (refer to Table 7).

Example 56

Example 51 was repeated except that 2,6-di-tert-butyl-p-cresol (Antage BHT, made by Kawaguchi Kagaku) was used as a solid antioxidant to produce a thermoplastic resin composition and a resin molded article (refer to Table 7).

Example 57

Example 51 was repeated except that tetrakis{methylene-3(3,5-di-tert-butyl-4-hydroxyphenyl)propionate}methane (Irganox 1010, made by Ciba Geigy) and 0.0025 kg of tris(2,4-di-tert-butyl) phosphate (Mark 2112, made by Asahi Denka Kogyo K.K.) were used as solid antioxidants to produce a thermoplastic resin composition and a resin molded article (refer to Table 7).

Comparative Example 33

Example 51 was repeated except that $N^\epsilon$-lauroyl lysine (Feimex L-12, made by Ahimomoto Co., Inc.) was not used to produce a thermoplastic resin composition and a resin molded article (refer to Table 7).

Comparative Examples 34 to 36

Example 51 was repeated except that glycerin monostearic acid ester (made by Tokyo Kasei), calcium stearate (made by Tokyo Kasei) or ethylenebisstearic acid amide (made by Tokyo Kasei) was used instead of $N^\epsilon$-lauroyl lysine (Feimex L-12, made by Ajinomoto Co., Inc.) to produce a thermoplastic resin composition and a resin molded article (refer to Table 7).

Example 58

Production 3 of a Thermoplastic Resin Composition and a Resin Molded Article:

$N^\epsilon$-lauroyl lysine (Feimex L-12, made by Ajinomoto Co., Inc. 0.02 kg) as an N-acyl basic amino acid, 2 kg of talc (High Filler #5000PJ, made by Matsumura Sangyo, average particle diameter 1.4 to 1.8 $\mu$m) and 10 kg of a polyamide resin (using a commercial non-stabilized resin) which had been predried at 110° C. for 5 hours were mixed at 1,720 rpm for 5 minutes, kneaded with a biaxial kneader (KCK 80×2–35 VEX (6), feed temperature=60° C., kneading 1 temperature=220° C., kneading 2 temperature=220° C., vent temperature=235° C., metering temperature=235° C., die temperature=235° C., number of screw rotations=70 rpm, jet amount=10.3 kg/hr), and then pelletized. Using the resulting pellets, a fluidity test was conducted according to JIS K7210. Further, the resulting pellets were injection-molded according to JIS K7152 using an injection-molding machine (N40-BI1, manufactured by The Japan Steel Works, Ltd., cylinder temperature—nozzle=280° C., front portion=280° C., center=275° C., rear portion=270° C., injection pressure=800 kg/cm², mold temperature=60 to 70° C.) to prepare multi-purpose test pieces according to JIS K7139. The appearance of the resulting test pieces was evaluated through visual observation, and the flexural strength (yield value) was measured according to JIS K7203. Subsequently, the thermal aging resistance test was conducted according to JIS K7212, and the change in the appearance was observed. The results of the evaluation are shown in Table 8.

Conditions for the Melt Flow Test:
230° C., 2.16 kgf, A method

Thermal Aging Resistance Test:
The crack of the surface was evaluated from the appearance (using 5 scores, 5 to 1, in order from the better condition).

TABLE 8

| <Formulation> | | (Unit: parts by weight) | | <Properties> | | |
|---|---|---|---|---|---|---|
| Example (Comparative Example) | Polyamide resin | Talc | Additives N-acyl basic amino acid and the like | Amount | Melt flow (g) | Flexural strength (kg/cm²) | Thermal aging resistance test (Visual observation of appearance) |
| Example 58 | 100 | 20 | Feimex L-12 | 0.20 | 34 | 750 | 5 |
| Comparative Example 37 | 100 | 20 | — | — | 20 | 730 | 1 |
| Comparative Example 38 | 100 | 20 | Glycerin monostearic acid ester | 0.20 | 21 | 700 | 2 |
| Comparative Example 39 | 100 | 20 | Calcium stearate | 0.20 | 24 | 710 | 3 |
| Comparative Example 40 | 100 | 20 | Ethylenebisstearic acid amide | 0.20 | 25 | 690 | 2 |

Comparative Example 37

Example 58 was repeated except that N$^\epsilon$-lauroyl lysine (Feimex L-12, made by Ajinomoto Co., Inc.) was not used to produce a thermoplastic resin composition and a resin molded article (refer to Table 8).

Comparative Examples 38 to 40

Example 58 was repeated except that glycerin monostearic acid ester (made by Tokyo Kasei), calcium stearate (made by Tokyo Kasei) or ethylenebisstearic acid amide (made by Tokyo Kasei) was used instead of N$^\epsilon$-lauroyl lysine (Feimex L-12, made by Ajinomoto Co., Inc.) to produce a thermoplastic resin composition and a resin molded article (refer to Table 8).

As is apparent from the results in Tables 6 to 8, the combined use of the N-acyl basic amino acid used in the present invention and the filler provides the excellent effect in the thermal aging resistance. Further, it is found that the lubricant (glycerin monostearic acid ester, calcium stearate or ethylenebisstearic acid amide) ordinarily used decreases the properties, especially the strength properties, and gives no effect of improving the thermal aging resistance. Further, from Table 7, it is found that the use of the antioxidant can markedly improve the thermal aging resistance.

As being clear from the above explanations on the effects of the thermoplastic resin composition incorporating the N-acyl basic amino acid in the present invention, the thermoplastic resin composition containing the N-acyl basic amino acid, the filler, the thermoplastic resin and as required, the antioxidant in the present invention markedly improves the thermal aging resistance when a resin molded article is formed by molding the same.

Example 59
Synthesis 1 of a Dibasic Acid Erythritol Ester:

A reaction flask fitted with a thermometer, a stirrer, a nitrogen introduction inlet and a reflux condenser was charged with 24.4 parts of adipic acid (made by Junsei Kagaku), 84.8 parts of dipentaerythritol (made by Tokyo Kasei) and 0.01 parts of p-toluenesulfonic acid (made by Junsei Kagaku). The temperature was elevated to 180° C. in a nitrogen stream over the course of 1 hour, and the mixture was heated at 180° C. for 2 hours. Subsequently, the heating was conducted until the acid value of the reaction solution reached approximately 1 (mg·KOH/g). Then, the reaction solution was cooled to room temperature. The resulting product is designated Derivative A (acid value 0.6, degree of esterification 16.7%).

Example 60
Synthesis 2 of a Dibasic Acid Erythritol Ester:

A reaction flask fitted with a thermometer, a stirrer, a nitrogen introduction inlet and a reflux condenser was charged with 40.5 parts of sebacic acid (made by Junsei Kagaku), 54.5 parts of pentaerythritol (made by Junsei Kagaku) and 0.01 parts of tetrabutylammonium iodide (made by Junsei Kagaku). The temperature was elevated to 180° C. in a nitrogen stream over the course of 1 hour, and the mixture was heated at 180° C. for 2 hours. Subsequently, the heating was conducted until the acid value of the reaction solution reached approximately 1 (mg·KOH/g). Then, the reaction solution was cooled to room temperature. The resulting product is designated Derivative B (acid value 0.4, degree of esterification 25.0%).

Example 61
Synthesis 3 of a Dibasic Acid Erythritol Ester:

A reaction flask fitted with a thermometer, a stirrer, a nitrogen introduction inlet and a reflux condenser was charged with 54.0 parts of sebacic acid (made by Junsei Kagaku), 36.4 parts of pentaerythritol (made by Junsei Kagaku) and 0.01 parts of tetrabutylammonium iodide (made by Junsei Kagaku). The temperature was elevated to 160° C. in a nitrogen stream over the course of 1 hour, and the mixture was heated at 160° C. for 2 hours. Subsequently, the heating was conducted until the acid value of the reaction solution reached approximately 1 (mg·KOH/g). Then, the reaction solution was cooled to room temperature. The resulting product is designated Derivative C (acid value 1.0, degree of esterification 49.9%).

Example 62
Synthesis 4 of a Dibasic acid Arythritol Ester:

A reaction flask fitted with a thermometer, a stirrer, a nitrogen introduction inlet and a reflux condenser was charged with 24.4 parts of adipic acid (made by Junsei Kagaku), 47.5 parts of stearic acid (made by Junsei Kagaku), 84.8 parts of dipentaerythritol (made by Tokyo Kasei) and 0.02 parts of p-toluenesulfonic acid (made by Junsei Kagaku). The temperature was elevated to 180° C. in a nitrogen stream over the course of 1 hour, and the mixture was heated at 180° C. for 2 hours. Subsequently, the heating was conducted until the acid value of the reaction solution reached approximately 1 (mg·KOH/g). Then, the reaction solution was cooled to room temperature. The resulting product is designated Derivative D (acid value 0.8, degree of esterification 25.0%).

Example 63
Synthesis 5 of a Dibasic Acid Erythritol Ester:
A reaction flask fitted with a thermometer, a stirrer, a nitrogen introduction inlet and a reflux condenser was charged with 12.4 parts of phthalic anhydride (made by Junsei Kagaku), 16.8 parts of lauric acid (made by Junsei Kagaku), 42.7 parts of dipentaerythritol (made by Tokyo Kasei) and 0.01 parts of tetrabutyltitanium (made by Tokyo Kasei). The temperature was elevated to 180° C. in a nitrogen stream over the course of 1 hour, and the mixture was then heated at 180° C. for 2 hours. Subsequently, the heating was conducted until the acid value of the reaction solution reached approximately 1 (mg·KOH/g). Then, the reaction solution was cooled to room temperature. The resulting product is designated Derivative E (acid value 0.6, degree of esterification 24.9%).

Example 64
Synthesis 6 of a Dibasic Acid Erythritol Ester:
A reaction flask fitted with a thermometer, a stirrer, a nitrogen introduction inlet and a reflux condenser was charged with 16.1 parts of adipic acid (made by Junsei Kagaku), 47.5 parts of stearic acid (made by Junsei Kagaku), 84.8 parts of dipentaerythritol (made by Tokyo Kasei) and 0.02 parts of p-toluenesulfonic acid (made by Tokyo Kasei). The temperature was elevated to 180° C. in a nitrogen stream over the course of 1 hour, and the mixture was heated at 180° C. for 2 hours. Subsequently, the heating was conducted until the acid value of the reaction solution reached approximately 1 (mg·KOH/g). Then, the reaction solution was cooled to room temperature. The resulting product is designated Derivative F (acid value 0.9, degree of esterification 19.4%).

Example 65
Synthesis 7 of a Dibasic Acid Erythritol Ester:
A reaction flask fitted with a thermometer, a stirrer, a nitrogen introduction inlet and a reflux condenser was charged with 24.4 parts of adipic acid (made by Junsei Kagaku) and 84.8 parts of pentaerythritol (made by Junsei Kagaku). The temperature was elevated to 240° C. in a nitrogen stream over the course of 1 hour. Stearic acid (48.3 parts, made by Junsei Kagaku) and 0.02 parts of p-toluenesulfonic acid (made by Junsei Kagaku) were added thereto, and the mixture was further heated at 240° C. for 2 hours. Subsequently, the heating was conducted until the acid value of the reaction solution reached approximately 1 (mg·KOH/g). Then, the reaction solution was cooled to room temperature. The resulting product is designated Derivative G (acid value 0.2, degree of esterification 37.0%).

Comparative Example 41
Synthesis 1 of a Monocarboxylic Acid Erythritol Ester:
A reaction flask fitted with a thermometer, a stirrer, a nitrogen introduction inlet and a reflux condenser was charged with 75.9 parts of stearic acid (made by Junsei Kagaku), 36.3 parts of pentaerythritol (made by Junsei Kagaku) and 0.01 parts of p-toluenesulfonic acid (made by Junsei Kagaku). The temperature was elevated to 180° C. in a nitrogen stream over the course of 1 hour. The mixture was heated at 180° C. for 2 hours. Subsequently, the heating was conducted until the acid value of the reaction solution reached approximately 1 (mg·KOH/g). Then, the reaction solution was cooled to room temperature. The resulting product is designated Derivative W (acid value 0.9, degree of esterification 25.0%).

Comparative Example 42
Synthesis 2 of a Monocarboxylic Acid Erythritol Ester:
A reaction flask fitted with a thermometer, a stirrer, a nitrogen introduction inlet and a reflux condenser was charged with 63.3 parts of stearic acid (made by Junsei Kagaku), 56.5 parts of dipentaerythritol (made by Tokyo Kasei) and 0.01 parts of p-toluenesulfonic acid (made by Junsei Kagaku). The temperature was elevated to 180° C. in a nitrogen stream over the course of 1 hour. The mixture was heated at 180° C. for 2 hours. Subsequently, the heating was conducted until the acid value of the reaction solution reached approximately 1 (mg·KOH/g). Then, the reaction solution was cooled to room temperature. The resulting product is designated Derivative X (acid value 0.8, degree of esterification 16.7%).

Comparative Example 43
Synthesis 8 of a Dibasic acid Erythritol Ester:
A reaction flask fitted with a thermometer, a stirrer, a nitrogen introduction inlet and a reflux condenser was charged with 24.4 parts of adipic acid (made by Junsei Kagaku), 284.5 parts of stearic acid (made by Junsei Kagaku), 84.8 parts of dipentaerythritol (made by Tokyo Kasei) and 0.01 parts of p-toluenesulfonic acid (made by Junsei Kagaku). The temperature was elevated to 180° C. in a nitrogen stream over the course of 1 hour. The mixture was heated at 180° C. for 2 hours. Subsequently, the heating was conducted until the acid value of the reaction solution reached approximately 1 (mg·KOH/g). Then, the reaction solution was cooled to room temperature. The resulting product is designated Derivative Y (acid value 0.4, degree of esterification 66.7%).

Comparative Example 44
Synthesis 9 of a Dibasic Acid Erythritol Ester:
A reaction flask fitted with a thermometer, a stirrer, a nitrogen introduction inlet and a reflux condenser was charged, with 54.0 parts of sebacic acid (made by Junsei Kagaku), 54.0 parts of lauric acid (made by Junsei Kagaku), 36.4 parts of pentaerythritol (made by Junsei Kagaku) and 0.01 parts of p-toluenesulfonic acid (made by Junsei Kagaku). The temperature was elevated to 180° C. in a nitrogen stream over the course of 1 hour. The mixture was heated at 180° C. for 2 hours. Subsequently, the heating was conducted until the acid value of the reaction solution reached approximately 1 (mg·KOH/g). Then, the reaction solution was cooled to room temperature. The resulting product is designated Derivative Z (acid value 0.6, degree of esterification 75.1%).

Example 66
Production 1 of a Thermoplastic Resin Composition and a Resin Molded Article:
The dibasic acid erythritol ester (0.02 kg, Derivative A) obtained in Example 59, 2 kg of talc (High Filler #5000PJ, made by Matsumura Sangyo, average particle diameter 1.4 to 1.8 $\mu$m) and a highly crystalline ethylene-propylene copolymer resin (using a commercial non-stabilized resin) which had been predried at 110° C. for 5 hours were mixed at 1,720 rpm for 5 minutes, kneaded with a biaxial kneader (PCM 30/30 Model, manufactured by Ikegai Iron Works, Ltd., cylinder temperature—C1=100° C., C2=220° C., C3=210° C., C4=210° C., C5=20° C., AD (adaptor temperature)=220° C., number of screw rotations=250 rpm, jet amount=8 kg/hour), and then pelletized. Using the resulting pellets, a fluidity test (melt flow) was conducted according to JIS K7210. Further, the resulting pellets were injection-molded according to JIS K7152 using an injection-molding machine (Clockner F 85, manufactured by The Japan Steel Works, Ltd., cylinder temperature—nozzle= 220° C., front portion=220° C., center=210° C., rear portion=200° C., injection pressure=360 kg/cm$^2$, injection speed=20%, mold temperature=45° C.) to prepare multi-purpose test pieces according to JIS K7139. The appearance of the resulting test pieces was evaluated through visual observation, and the flexural strength (yield value) was measured according to JIS K7203. Subsequently, the thermal aging resistance test was conducted according to JIS K7212, and the change in the appearance was observed. The results of the evaluation are shown in Table 9.

Conditions for the Fluidity Test:

230°C., 2.16 kgf, A method

Thermal Aging Resistance Test:

The crack of the surface was evaluated from the appearance (using 5 scores, 5 to 1, in order from the better condition).

of 0.02 kg of Derivative A to produce a thermoplastic resin composition and a resin molded article (refer to Table 9).

Comparative Example 45

Example 66 was repeated except that the dibasic acid erythritol ester, Derivative A was not used to produce a thermoplastic resin composition and a resin molded article (refer to Table 9).

Comparative Example 46

Example 66 was repeated except that 0.3 kg of the dibasic acid erythritol ester, Derivative D were used instead of 0.02 kg of Derivative A to produce a thermoplastic resin composition and a resin molded article (refer to Table 9).

Comparative Example 47

Example 66 was repeated except that 1 kg of the dibasic acid erythritol ester, Derivative D was used instead of 0.02 kg of Derivative A to produce a thermoplastic resin composition and a resin molded article (refer to Table 9).

Comparative Example 48

Example 66 was repeated except that 0.02 kg of the dibasic acid erythritol ester, Derivative W obtained in Com-

TABLE 9

| | <Formulation> | | (unit: parts by weight) | | <Properties> | | |
|---|---|---|---|---|---|---|---|
| | Ethylene- | | Additives | | | | Thermal aging resistance test (Visual |
| Example (Comparative Example) | propylene copolymer resin | Talc | Dibasic acid erythritol ester and the like | Amount | Melt flow (g) | Flexural strength (kg/cm$^2$) | observation of appearance) |
| Example 66 | 100 | 20 | Derivative A | 0.20 | 32 | 460 | 5 |
| Example 67 | 100 | 20 | Derivative B | 0.20 | 30 | 460 | 5 |
| Example 68 | 100 | 20 | Derivative C | 0.20 | 31 | 460 | 5 |
| Example 69 | 100 | 20 | Derivative D | 0.20 | 37 | 460 | 5 |
| Example 70 | 100 | 20 | Derivative E | 0.20 | 35 | 460 | 5 |
| Example 71 | 100 | 20 | Derivative F | 0.20 | 35 | 460 | 5 |
| Example 72 | 100 | 20 | Derivative G | 0.20 | 38 | 460 | 5 |
| Example 73 | 100 | 20 | Derivative D | 0.05 | 31 | 460 | 5 |
| Example 74 | 100 | 20 | Derivative D | 0.80 | 40 | 450 | 5 |
| Comparative Example 45 | 100 | 20 | — | — | 18 | 450 | 1 |
| Comparative Example 46 | 100 | 20 | Derivative D | 3.00 | 38 | 430 | 4 |
| Comparative Example 47 | 100 | 20 | Derivative D | 10.00 | 40 | 420 | 4 |
| Comparative Example 48 | 100 | 20 | Derivative W | 0.20 | 28 | 450 | 2 |
| Comparative Example 49 | 100 | 20 | Derivative X | 0.20 | 27 | 450 | 2 |
| Comparative Example 50 | 100 | 20 | Derivative Y | 0.20 | 38 | 420 | 1 |
| Comparative Example 51 | 100 | 20 | Derivative Z | 0.20 | 41 | 420 | 1 |
| Comparative Example 52 | 100 | 20 | Dipentaerythritol | 0.20 | 19 | 430 | 2 |
| Comparative Example 53 | 100 | 20 | Glycerin monostearic acid ester | 0.20 | 21 | 430 | 1 |
| Comparative Example 54 | 100 | 20 | Calcium stearate | 0.20 | 22 | 420 | 2 |
| Comparative Example 55 | 100 | 20 | Ethylenebisstearic acid amide | 0.20 | 24 | 420 | 1 |

Examples 67 to 72

Example 66 was repeated except that 0.02 kg of the dibasic acid erythritol ester, Derivative B, C, D, E, F or G obtained in Examples 60, 61, 62, 63 or 64 were used instead of 0.02 kg of Derivative A to produce a thermoplastic resin composition and a resin molded article (refer to Table 9).

Example 73

Example 66 was repeated-except that 0.005 kg of the dibasic acid erythritol ester, Derivative D were used instead of 0.02 kg of Derivative A to produce a thermoplastic resin composition and a resin molded article (refer to Table 9).

Example 74

Example 66 was repeated except that 0.08 kg of the dibasic acid erythritol ester, Derivative D were used instead parative Example 41 were used instead of 0.02 kg of Derivative A to produce a thermoplastic resin composition and a resin molded article (refer to Table 9).

Comparative Example 49

Example 66 was repeated except that 0.02 kg of the dibasic acid erythritol ester, Derivative X obtained in Comparative Example 42 were used instead of 0.02 kg of Derivative A to produce a thermoplastic resin composition and a resin molded article (refer to Table 9).

Comparative Example 50

Example 66 was repeated except that 0.02 kg of the dibasic acid erythritol ester, Derivative Y obtained in Comparative Example 43 were used instead of 0.02 kg of Derivative A to produce a thermoplastic resin composition and a resin molded article (refer to Table 9).

Comparative Example 51

Example 66 was repeated except that 0.02 kg of the dibasic acid erythritol ester, Derivative Z obtained in Comparative Example 44 were used instead of 0.02 kg of Derivative A to produce a thermoplastic resin composition and a resin molded article (refer to Table 9).

Comparative Examples 52 to 55

Example 66 was repeated except that dipentaerythritol (made by Tokyo Kasei), glycerin monostearic acid ester (made by Tokyo Kasei), calcium stearate (made by Tokyo Kasei) or ethylenebisstearic acid amide (made by Tokyo Kasei) was used instead of the dibasic acid erythritol ester derivative A to produce a thermoplastic resin composition and a resin molded article (refer to Table 9).

Example 75
Production 2 of a Thermoplastic Resin Composition and a Resin Molded Article:

The dibasic acid erythritol ester (0.02 kg, Derivative A) obtained in Example 59, 0.005 kg of tetrakis{methylene-3(3,5-di-tert-butyl-4-hydroxyphenyl)propionate}methane (Irganox 1010, made by Ciba Geigy) as a solid antioxidant, 2 kg of talc (High Filler #5000 PJ, made by Matsumura Sangyo, average particle diameter 1.4 to 1.8 µm) and 10 kg of a highly crystalline ethylene-propylene copolymer resin (using a commercial non-stabilized resin) which had been predried at 110° C. for 5 hours were mixed at 1,720 rpm for 5 minutes, kneaded using a biaxial kneader (PCM30/30 Model, manufactured by Ikegai Iron works, Ltd., cylinder temperature—C1=100° C., C2=220° C., C3=210° C., C4=210° C., C5=20° C., AD (adaptor temperature)=220° C., number of screw rotations=250 rpm, jet amount=8 kg/hr), and pelletized. Using the resulting pellets, a fluidity test (melt flow) was conducted according to JIS K7210. Further, the resulting pellets were injection-molded according to JIS K7152 using an injection-molding machine (Clockner F 85, manufactured by The Japan Steel Works, Ltd., cylinder temperature—nozzle=220° C., front portion=220° C., center=210° C., rear portion=200° C., injection pressure=360 kg/cm$^2$, injection speed=20%, mold temperature=45° C.) to prepare multi-purpose test pieces according to JIS K7139. The appearance of the resulting test pieces was evaluated, and the flexural strength (yield value) was measured according to JIS K7203. Subsequently, the thermal aging resistance test was conducted according to JIS K7212, and the change in the appearance was observed. The results of the evaluation are shown in Table 10.

Conditions for the Fluidity Test:
230° C., 2.16 kgf, A method
Thermal Aging Resistance Test:
The crack of the surface was evaluated from the appearance (using 5 scores, 5 to 1, in order from the better condition).

TABLE 10

| Example (Comparative Example) | Ethylene-propylene copolymer resin | Talc | Solid antioxidant 1 | Amount | Solid antioxidant 2 | Amount | Additives: Dibasic acid erythritol ester and the like | Amount | Melt flow (g) | Flexural strength (kg/cm$^2$) | Thermal aging resistance test (Visual observation of appearance) |
|---|---|---|---|---|---|---|---|---|---|---|---|
| Example 75 | 100 | 20 | IRGANOX1010 | 0.05 | | | Derivative A | 0.20 | 34 | 460 | 5 |
| Example 76 | 100 | 20 | IRGANOX1010 | 0.05 | | | Derivative B | 0.20 | 35 | 460 | 5 |
| Example 77 | 100 | 20 | IRGANOX1010 | 0.05 | | | Derivative C | 0.20 | 32 | 460 | 5 |
| Example 78 | 100 | 20 | IRGANOX1010 | 0.05 | | | Derivative D | 0.20 | 39 | 460 | 5 |
| Example 79 | 100 | 20 | IRGANOX1010 | 0.05 | | | Derivative E | 0.20 | 38 | 460 | 5 |
| Example 80 | 100 | 20 | IRGANOX1010 | 0.05 | | | Derivative F | 0.20 | 39 | 450 | 5 |
| Example 81 | 100 | 20 | IRGANOX1010 | 0.05 | | | Derivative G | 0.20 | 38 | 460 | 5 |
| Example 82 | 100 | 20 | IRGANOX1010 | 0.05 | | | Derivative D | 0.05 | 35 | 450 | 4 |
| Example 83 | 100 | 20 | BHT | 0.05 | | | Derivative D | 0.20 | 37 | 460 | 5 |
| Example 84 | 100 | 20 | IRGANOX1010 | 0.025 | MARK2112 | 0.025 | Derivative D | 0.20 | 37 | 460 | 5 |
| Comparative Example 56 | 100 | 20 | IRGANOX1010 | 0.05 | | | — | — | 19 | 450 | 2 |
| Comparative Example 57 | 100 | 20 | IRGANOX1010 | 0.05 | | | Derivative D | 3.00 | 38 | 410 | 4 |
| Comparative Example 58 | 100 | 20 | IRGANOX1010 | 0.05 | | | Derivative W | 0.20 | 31 | 440 | 2 |
| Comparative Example 59 | 100 | 20 | IRGANOX1010 | 0.05 | | | Derivative X | 0.20 | 32 | 440 | 2 |
| Comparative Example 60 | 100 | 20 | IRGANOX1010 | 0.05 | | | Derivative Y | 0.20 | 38 | 420 | 1 |
| Comparative Example 61 | 100 | 20 | IRGANOX1010 | 0.05 | | | Derivative Z | 0.20 | 40 | 410 | 1 |
| Comparative Example 62 | 100 | 20 | IRGANOX1010 | 0.025 | DMTP | 0.075 | Derivative X | 0.20 | 30 | 440 | 3 |
| Comparative Example 63 | 100 | 20 | IRGANOX1010 | 0.05 | | | Dipentaerythritol | 0.20 | 18 | 410 | 2 |
| Comparative Example 64 | 100 | 20 | IRGANOX1010 | 0.05 | | | Glycerin monostearic acid ester | 0.20 | 25 | 430 | 2 |
| Comparative Example 65 | 100 | 20 | IRGANOX1010 | 0.05 | | | Calcium stearate | 0.20 | 24 | 420 | 1 |
| Comparative Example 66 | 100 | 20 | IRGANOX1010 | 0.05 | | | Ethylenebisstearic acid amide | 0.20 | 22 | 420 | 1 |

Examples 76 to 81

Example 75 was repeated except that 0.02 kg of the dibasic acid erythritol ester, Derivative B, C, D, E, F or G obtained in Examples 60, 61, 62, 63 or 64 were used instead of 0.02 kg of Derivative A to produce a thermoplastic resin composition and a resin molded article (refer to Table 10).

Example 82

Example 75 was repeated except that 0.005 kg of the dibasic acid erythritol ester, Derivative A were used instead of 0.02 kg of the same compound to produce a thermoplastic resin composition and a resin molded article (refer to Table 10).

Example 83

Example 75 was repeated except that 2,6-di-tert-butyl-p-cresol (Antage BHT, made by Kawaguchi Kagaku) was used as a solid antioxidant to produce a thermoplastic resin composition and a resin molded article (refer to Table 10).

Example 84

Example 75 was repeated except that 0.0025 kg of tetrakis{methylene-3(3,5-di-tert-butyl-4-hydroxyphenyl) propionate}methane (Irganox 1010, made by Ciba Geigy) and 0.0025 kg of tris(2,4-di-tert-butyl) phosphite (Mark 2112, made by Asahi Denka Kogyo K.K.) were used as solid antioxidants to produce a thermoplastic resin composition and a resin molded article (refer to Table 10).

Comparative Example 56

Example 75 was repeated except that the dibasic acid erythritol ester, Derivative A was not used to produce a thermoplastic resin composition and a resin molded article (refer to Table 10).

Comparative Example 57

Example 75 was repeated except that 0.3 kg of the dibasic acid erythritol ester, Derivative D were used instead of 0.02 kg of Derivative A to produce a thermoplastic resin composition and a resin molded article (refer to Table 10).

Comparative Example 58

Example 75 was repeated except that 0.02 kg of the dibasic acid erythritol ester, Derivative W obtained in Comparative Example 41 were used instead of 0.02 kg of Derivative A to produce a thermoplastic resin composition and a resin molded article (refer to Table 10).

Comparative Example 59

Example 75 was repeated except that 0.02 kg of the dibasic acid erythritol ester, Derivative X obtained in Comparative Example 42 were used instead of 0.02 kg of Derivative A to produce a thermoplastic resin composition and a resin molded article (refer to Table 10).

Comparative Example 60

Example 75 was repeated except that 0.02 kg of the dibasic acid erythritol ester, Derivative Y obtained in Comparative Example 43 were used instead of 0.02 kg of Derivative A to produce a thermoplastic resin composition and a resin molded article (refer to Table 10).

Comparative Example 61

Example 75 was repeated except that 0.02 kg of the dibasic acid erythritol ester, Derivative Z obtained in Comparative Example 44 were used instead of 0.02 kg of Derivative A to produce a thermoplastic resin composition and a resin molded article (refer to Table 10).

Comparative Example 62

Example 75 was repeated except that 0.0025 kg of tetrakis{methylene-3(3,5-di-tert-butyl-4-hydroxyphenyl) propionate}methane (Irganox 1010, made by Ciba Geigy) and dimyristyl thiopropionate (DMTP, made by Yoshitomi Pharmaceutical Ind., Ltd.) were used as solid antioxidants to produce a thermoplastic resin composition and a resin molded article (refer to Table 10).

Example 81 to 84

Example 75 was repeated except that dipentaerythritol (made by Tokyo Kasei), glycerin monostearic acid ester (made by Tokyo Kasei), calcium stearate (made by Tokyo Kasei) or ethylenebisstearic acid amide (made by Tokyo Kasei) was used instead of the dibasic acid erythritol ester derivative A to produce a thermoplastic resin composition and a resin molded article (refer to Table 10).

Example 85

Production 3 of a Thermoplastic Resin Composition and a Resin Molded Article

The dibasic acid erythritol ester (0.02 kg, Derivative A) obtained in Example 59, 2 kg of talc (High Filler #5000 PJ, made by Matsumura Sangyo, average particle diameter 1.4 to 1.8 μm) and 10 kg of a polyamide resin (using a commercial non-stabilized resin) which had been predried at 110° C. for 5 hours were mixed at 1,720 rpm for 5 minutes, kneaded using a biaxial kneader (KCK 80×2–35 VEX (6), feed temperature=60° C., kneading 1 temperature=220° C., kneading 2 temperature=220° C., vent temperature=235° C., metering temperature=235° C., die temperature=235° C., number of screw rotations=70 rpm, jet amount=10.3 kg/hr), and pelletized. Using the resulting pellets, a fluidity test (melt flow) was conducted according to JIS K7210. Further, the resulting pellets were injection-molded according to JIS K7152 using an injection-molding machine (N40-BII, manufactured by The Japan Steel Works, Ltd., cylinder temperature—nozzle=280° C., front portion=280° C., center=275° C., rear portion=270° C., injection pressure= 800 kg/cm$^2$, mold temperature=60 to 70° C.) to prepare multi-purpose test pieces according to JIS K7139. The appearance of the resulting test pieces was evaluated, and the flexural strength (yield) was measured according to JIS K7203. Subsequently, the thermal aging resistance test was conducted according to JIS K7212, and the change in the appearance was observed. The results of the evaluation are shown in Table 11.

Conditions for the Fluidity Test:

230° C., 2.16 kgf, A method

Thermal aging Resistance Test:

The crack of the surface was evaluated from the appearance (using 5 scores, 5 to 1, in order from the better condition).

TABLE 11

| Example (Comparative Example) | <Formulation> (unit: parts by weight) | | Additives | | <Properties> | | Thermal aging resistance test (Visual observation of appearance) |
|---|---|---|---|---|---|---|---|
| | Polyamide resin | Talc | Dibasic acid erythritol ester and the like | Amount | Melt flow (g) | Flexural strength (kg/cm²) | |
| Example 85 | 100 | 20 | Derivative A | 0.20 | 32 | 740 | 5 |
| Comparative Example 67 | 100 | 20 | — | — | 20 | 730 | 1 |
| Comparative Example 68 | 100 | 20 | Dipentaerythritol | 0.20 | 20 | 680 | 3 |
| Comparative Example 69 | 100 | 20 | Glycerin monostearic acid ester | 0.20 | 21 | 700 | 2 |
| Comparative Example 70 | 100 | 20 | Calcium stearate | 0.20 | 24 | 710 | 3 |
| Comparative Example 71 | 100 | 20 | Ethylenebisstearic acid amide | 0.20 | 25 | 690 | 2 |

Comparative Example 67

Example 85 was repeated except that the dibasic acid erythritol ester (Derivative A) was not used to produce a thermoplastic resin composition and a resin molded article (refer to Table 11).

Comparative Examples 68 to 71

Example 85 was repeated except that dipentaerythritol (made by Tokyo Kasei), glycerin monostearic acid ester (made by Tokyo Kasei), calcium stearate (made by Tokyo Kasei) or ethylenebisstearic acid amide (made by Tokyo Kasei) was used instead of the dibasic acid erythritol ester derivative A to produce a thermoplastic resin composition and a resin molded article (refer to Table 11).

As is apparent from the results shown in Tables 9 to 11, the dibasic acid erythritol ester having the specific degree of esterification and the filler of the present invention are used, and the antioxidant, especially the solid antioxidant is used in combination, whereby the amount of the ester can be decreased, and the synergistic effect in the thermal aging resistance is found. Further, it is found that the lubricant (glycerin monostearic acid ester, calcium stearate or ethylenebisstearic acid amide) which is ordinarily used decreases the properties, especially, the strength properties, and it is scarcely effective for improving the thermal aging resistance.

As being clear from the above explanation on the effects of the thermoplastic resin composition incorporating the dibasic acid erythrytol ester in the modification in the present invention, the thermoplastic resin composition containing the dibasic acid erythritol ester having the predetermined degree of esterification of the present invention, the filler, the specific thermoplastic resin used in the present invention and as required, the antioxidant can decrease the amount of the ester, and when this is molded to provide a resin molded article, the thermal aging resistance is markedly improved.

What is claimed is:

1. A thermoplastic resin composition comprising:
    (1) a thermoplastic resin;
    (2) a polyglycerin derivative consisting of a derivative in which at least two and up to two thirds of hydroxyl groups in said polyglycerin derivative are esterified with a fatty acid;
    wherein said polyglycerin is selected from the group consisting of tri-glycerin, tetra-glycerin, penta-glycerin, hexa-glycerin, hepta-glycerin, octa-glycerin, nona-glycerin, deca-glycerin and a mixture thereof; and
    (3) an antioxidant,
    wherein said thermoplastic resin is a polyolefin resin.

2. The thermoplastic resin composition according to claim 1, wherein an acyl group of a fatty acid-esterified moiety in said polyglycerin derivative is a linear or branched, saturated or unsaturated hydrocarbon monocarboxylic acid having from 5 to 31 carbon atoms.

3. The thermoplastic resin composition according to claim 1, wherein at least two hydroxyl group of said polyglycerin derivative are esterified with different fatty acids.

4. The thermoplastic resin composition according to claim 1, wherein said polyglycerin is linear, branched or cyclic.

5. The thermoplastic resin composition according to claim 1, wherein said fatty acid is selected from the group consisting of caproic acid, enanthylic acid, caprylic acid, nonanoic acid, capric acid, octylic acid, lauric acid, myristic acid, behenic acid, palmitic acid, isostearic acid, stearic acid, oleic acid, isononanoic acid and arachic acid.

6. The thermoplastic resin composition according to claim 1, wherein said antioxidant is a phenolic antioxidant, and wherein said phenolic antioxidant is selected from the group consisting of 2,6-di-tert-butyl-p-cresol, 2,2'-methylenebis(4-methyl-6-tert-butylphenol), tetrakis{methylene-3-(3,5-di-tert-butyl-4-hydroxyphenyl)propionate}methane, 1,3,5-trimethyl-2,4,6-tris(3,5-di-tert-butyl-4-hydroxybenzyl)benzene, 1,1,3-tris-(2-methyl-4-hydroxy-5-tert-butylphenol)butane and a combination thereof.

7. The thermoplastic resin composition according to claim 1, wherein an amount of antioxidant is 0.01 to 10 parts by weight per 100 parts by weight of said thermoplastic resin.

8. The thermoplastic resin composition according to claim 1, wherein an amount of polyglycerin derivative is 0.1 to 1000 parts by weight per 100 parts by weight of said antioxidant.

9. The thermoplastic resin composition according to claim 1, wherein said polyolefin resin is selected from the group consisting of polypropylene resins and ethylene-propylene copolymer resins.

10. The thermoplastic resin composition according to claim 1, which further comprises:
    (4) a silicate filler selected from the group consisting of talc, mica, and combinations thereof.

11. The thermoplastic resin composition according to claim 10, wherein an amount of said filler is 0.1 to 300 parts by weight per 100 parts by weight of said thermoplastic resin.

12. The thermoplastic resin composition according to claim 10, wherein an amount of the polyglycerin derivative is between 0.1 and 5,000 parts by weight, and the amount of the filler is between 100 and 10,000 parts by weight, per 100 parts by weight of the antioxidant.

13. The thermoplastic resin composition according to claim 1, wherein said polyglycerin derivative in which at least two and up to two thirds of hydroxyl groups in said polyglycerin derivative are esterified with a fatty acid is present in an amount of 0.01 to 10 parts by weight per 100 parts by weight of said thermoplastic resin.

14. The thermoplastic resin composition according to claim 1, wherein said polyglycerin derivative in which at least two and up to two thirds of hydroxyl groups in said polyglycerin derivative are esterified with a fatty acid is present in an amount of 0.05 to 1 parts by weight per 100 parts by weight of said thermoplastic resin.

15. A method for improving a thermal aging resistance of a thermoplastic resin, comprising:

adding to a thermoplastic resin a polyglycerin derivative consisting of a derivative in which at least two and up to two thirds of hydroxyl groups in said polyglycerin derivative are esterified with a fatty acid, and an antioxidant;

wherein said polyglycerin is selected from the group consisting of tri-glycerin, tetra-glycerin, penta-glycerin, hexa-glycerin, hepta-glycerin, octa-glycerin, nona-glycerin, deca-glycerin and a mixture thereof, and wherein said thermoplastic resin is a polyolefin resin.

16. The method according to claim 15, wherein an acyl group of a fatty acid-esterified moiety in said polyglycerin derivative is a linear or branched, saturated or unsaturated hydrocarbon monocarboxylic acid having from 5 to 31 carbon atoms.

17. The method according to claim 15, said polyolefin resin is selected from the group consisting of polypropylene resins and ethylene-propylene copolymer resins.

18. The method of claim 15, which further comprises:

adding a silicate filler selected from the group consisting of talc, mica, and combinations thereof to said thermoplastic resin composition.

19. The method according to claim 18, wherein an amount of the polyglycerin derivative is between 0.1 and 5,000 parts by weight, and the amount of the filler is between 100 and 10,000 parts by weight, per 100 parts by weight of the antioxidant.

20. The method of claim 15, wherein said polyglycerin derivative in which at least two and up to two thirds of hydroxyl groups in said polyglycerin derivative are esterified with a fatty acid is added to said thermoplastic resin composition in an amount of 0.01 to 10 parts by weight per 100 parts by weight of said thermoplastic resin.

21. The method of claim 15, wherein said polyglycerin derivative in which at least two and up to two thirds of hydroxyl groups in said polyglycerin derivative are esterified with a fatty acid is added to said thermoplastic resin composition in an amount of 0.05 to 1 parts by weight per 100 parts by weight of said thermoplastic resin.

22. A thermoplastic resin composition consisting of:

(1) a thermoplastic resin;

(2) a polyglycerin derivative in which at least two and up to two thirds of hydroxyl groups in said polyglycerin derivative are esterified with a fatty acid;

wherein said polyglycerin is selected from the group consisting of tri-glycerin, tetra-glycerin, penta-glycerin, hexa-glycerin, hepta-glycerin, octa-glycerin, nona-glycerin, deca-glycerin and a mixture thereof;

(3) an antioxidant; and (4) a filler, wherein said thermoplastic resin is a polyolefin resin.

23. The thermoplastic resin composition according to claim 22, wherein said antioxidant is a phenolic antioxidant, and wherein said phenolic antioxidant is selected from the group consisting of 2,6-di-tert-butyl-p-cresol, 2,2'-methylenebis(4-methyl-6-tert-butylphenol), tetrakis{methylene-3-(3,5-di-tert-butyl-4-hydroxyphenyl)propionate}methane, 1,3,5-trimethyl-2,4,6-tris(3,5-di-tert-butyl-4-hydroxybenzyl)benzene, 1,1,3-tris-(2-methyl-4-hydroxy-5-tert-butylphenol)butane and a combination thereof.

24. The thermoplastic resin composition according to claim 22, wherein an amount of said filler is 0.1 to 300 parts by weight per 100 parts by weight of said thermoplastic resin.

25. The thermoplastic resin composition according to claim 22, wherein an amount of said polyglycerin derivative is between 0.1 and 5,000 parts by weight, and the amount of said filler is between 100 and 10,000 parts by weight, per 100 parts by weight of the antioxidant.

26. The thermoplastic resin composition according to claim 22, wherein said filler is selected from the group consisting of talc, mica, and combinations thereof.

27. The thermoplastic resin composition according to claim 22, wherein said polyglycerin derivative is present in an amount of 0.01 to 10 parts by weight per 100 parts by weight of said thermoplastic resin.

28. The thermoplastic resin composition according to claim 22, wherein said polyglycerin derivative is present in an amount of 0.05 to 1 parts by weight per 100 parts by weight of said thermoplastic resin.

29. A method for improving a thermal aging resistance of a thermoplastic resin, comprising:

adding to a thermoplastic resin a composition consisting of:

(1) polyglycerin derivative in which at least two and up to two thirds of hydroxyl groups in said polyglycerin derivative are esterified with a fatty acid, wherein said polyglycerin is selected from the group consisting of tri-glycerin, tetra-glycerin, penta-glycerin, hexa-glycerin, hepta-glycerin, octa-glycerin, nona-glycerin, deca-glycerin and a mixture thereof, and wherein said thermoplastic resin is a polyolefin resin;

(2) an antioxidant; and (3) a filler.

30. The method according to claim 29, wherein said antioxidant is a phenolic antioxidant, and wherein said phenolic antioxidant is selected from the group consisting of 2,6-di-tert-butyl-p-cresol, 2,2'-methylenebis(4-methyl-6-tert-butylphenol), tetrakis{methylene-3-(3,5-di-tert-butyl-4-hydroxyphenyl)propionate}methane, 1,3,5-trimethyl-2,4,6-tris(3,5-di-tert-butyl-4-hydroxybenzyl)benzene, 1,1,3-tris-(2-methyl-4-hydroxy-5-tert-butylphenol)butane and a combination thereof.

31. The method according to claim 29, wherein said filler is added in an amount of 0.1 to 300 parts by weight per 100 parts by weight of said thermoplastic resin.

32. The method according to claim 29, wherein said polyglycerin derivative is added in an amount of between 0.1 and 5,000 parts by weight, and said filler is added in an amount of between 100 and 10,000 parts by weight, per 100 parts by weight of the antioxidant.

33. The method of claim 29, wherein said filler is selected from the group consisting of talc, mica, and combinations thereof.

34. The method of claim 29, wherein said polyglycerin derivative is added to said thermoplastic resin composition in an amount of 0.01 to 10 parts by weight per 100 parts by weight of said thermoplastic resin.

35. The method of claim 29, wherein said polyglycerin derivative is added to said thermoplastic resin composition in an amount of 0.05 to 1 parts by weight per 100 parts by weight of said thermoplastic resin.

* * * * *